(12) United States Patent
Kusaka et al.

(10) Patent No.: US 8,738,625 B2
(45) Date of Patent: May 27, 2014

(54) LOG MANAGEMENT SYSTEM AND PROGRAM

(75) Inventors: Yusuke Kusaka, Tokyo (JP); Tomotada Naito, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/581,433

(22) PCT Filed: Jun. 5, 2012

(86) PCT No.: PCT/JP2012/064468
§ 371 (c)(1),
(2), (4) Date: Aug. 27, 2012

(87) PCT Pub. No.: WO2013/183115
PCT Pub. Date: Dec. 12, 2013

(65) Prior Publication Data
US 2013/0325913 A1 Dec. 5, 2013

(51) Int. Cl.
*G06F 7/00* (2006.01)
*G06F 17/00* (2006.01)
*G06F 17/30* (2006.01)
*G06F 11/34* (2006.01)

(52) U.S. Cl.
CPC ...... *G06F 11/3438* (2013.01); *G06F 17/30598* (2013.01)
USPC .......................................... 707/737; 707/672

(58) Field of Classification Search
CPC .................. G06F 11/3438; G06F 17/30598
USPC .................................................. 707/672, 737
See application file for complete search history.

(56) References Cited

U.S. PATENT DOCUMENTS 5,696,702 A * 12/1997 Skinner et al. ................. 702/186
6,065,138 A *  5/2000 Gould et al. ................... 714/47.2
6,789,045 B2 *  9/2004 Lehman ........................ 702/178
(Continued)

FOREIGN PATENT DOCUMENTS

| JP | 2002-208050 A | 7/2002 |
| JP | 2009-116617 A | 5/2009 |
| JP | 2011-164936 A | 8/2011 |
| JP | 2012-098958 A | 5/2012 |

OTHER PUBLICATIONS

PCT International Search Report on application PCT/JP2012/064468 mailed Jul. 17, 2012; 2 pages.

(Continued)

*Primary Examiner* — Charles Lu
(74) *Attorney, Agent, or Firm* — Foley & Lardner LLP

(57) ABSTRACT

A log management system for analyzing and managing a log acquired in a computer is provided. The system generates log groups each formed of log records with reference to the log. The system identifies active periods, in each of which a display area is active, in the log groups, and compares a start-to-end period from a start time to an end time of a reference log group selected from the log groups with active periods of subject log groups other than the reference operation log group individually to identify one or more subject log groups having an active period included in the start-to-end period. The system individually determines whether to include the identified one or more subject log groups in the same first cluster as the reference log group, based on an active period length of each of the identified one or more subject log groups within the start-to-end period.

10 Claims, 28 Drawing Sheets

(56) References Cited

U.S. PATENT DOCUMENTS

| | | | |
|---|---|---|---|
| 8,321,432 B2* | 11/2012 | Lung et al. | 707/754 |
| 8,352,414 B2* | 1/2013 | Bhamidipaty et al. | 707/601 |
| 8,364,514 B2* | 1/2013 | Macbeth et al. | 705/7.25 |
| 8,413,250 B1* | 4/2013 | Krynski | 726/26 |
| 2007/0033187 A1* | 2/2007 | Friedman et al. | 707/7 |
| 2010/0324964 A1* | 12/2010 | Callanan et al. | 705/9 |
| 2013/0110588 A1* | 5/2013 | Livne et al. | 705/7.38 |
| 2013/0143521 A1* | 6/2013 | Hernandez et al. | 455/405 |

OTHER PUBLICATIONS

PCT Written Opinion of the International Searching Authority on application PCT/JP2012/064468 mailed Jul. 17, 2012; 4 pages.

* cited by examiner

FIG. 4

OPERATION LOG DB 212

| OPERATION DATE/TIME | OPERATION TYPE | MACHINE NAME | USER NAME | PROCESS ID | PROCESS NAME | INPUT INFORMATION | OUTPUT INFORMATION |
|---|---|---|---|---|---|---|---|
| 2011/11/28 08:59:58 | LOG ON | PC1 | UserA | - | - | - | - |
| 2011/11/28 08:59:59 | START PROCESS | PC1 | UserA | 1 | document.exe | - | - |
| 2011/11/28 09:00:01 | OPEN FILE | PC1 | UserA | 1 | document.exe | D:¥current system information.doc | - |
| 2011/11/28 10:59:59 | DEACTIVATE WINDOW | PC1 | UserA | 1 | document.exe | - | - |
| 2011/11/28 11:00:00 | START PROCESS | PC1 | UserA | 2 | browser.exe | - | - |
| 2011/11/28 11:00:00 | WEB ACCESS | PC1 | UserA | 2 | browser.exe | http://www.yyyy.co.jp | - |
| 2011/11/28 11:00:01 | UPLOAD FILE | PC1 | UserA | 2 | browser.exe | D:¥current state analysis report.doc | - |
| 2011/11/28 11:00:02 | END PROCESS | PC1 | UserA | 2 | browser.exe | - | - |
| 2011/11/28 12:00:00 | END PROCESS | PC1 | UserA | 1 | document.exe | - | - |
| 2011/11/28 13:00:00 | ACTIVATE WINDOW | PC1 | UserA | 1 | document.exe | - | - |
| 2011/11/28 16:00:00 | END PROCESS | PC1 | UserA | 1 | document.exe | - | - |
| 2011/11/28 16:00:01 | LOG OFF | PC1 | UserA | - | - | - | - |

FIG. 5

ASSOCIATION DEFINITION TABLE 213

| OPERATION TYPE | INPUT INFORMATION | OUTPUT INFORMATION |
|---|---|---|
| START UP PC | - | - |
| SHUT DOWN PC | - | - |
| LOG ON | - | - |
| LOG OFF | - | - |
| START PROCESS | - | - |
| END PROCESS | - | - |
| ACTIVATE WINDOW | | |
| DEACTIVATE WINDOW | | |
| COPY FILE | FILE PATH TO COPY SOURCE | FILE PATH TO COPY DESTINATION |
| MOVE FILE | FILE PATH TO MOVE SOURCE | FILE PATH TO MOVE DESTINATION |
| RENAME FILE | FILE PATH BEFORE CHANGE | FILE PATH AFTER CHANGE |
| CREATE FILE | - | FILE PATH TO CREATED FILE |
| SAVE FILE | - | PATH TO DESTINATION TO SAVE |
| DELETE FILE | FILE PATH TO DELETED FILE | - |
| OPEN FILE | FILE PATH TO OPENED FILE | - |
| UPLOAD FILE | FILE PATH TO UPLOAD SOURCE | - |
| DOWNLOAD FILE | - | FILE PATH TO DESTINATION TO SAVE |
| FTP TRANSMISSION | FILE PATH TO TRANSMISSION SOURCE | DESTINATION URL |
| FTP RECEPTION | SOURCE URL | FILE PATH TO DESTINATION TO SAVE |
| SEND MAIL WITH ATTACHMENT | FILE PATH TO TRANSMISSION SOURCE | ADDRESSEE'S MAIL ADDRESS |
| RECEIVE MAIL WITH ATTACHMENT | SENDER'S MAIL ADDRESS | RECEIVED DATA |
| SAVE MAIL WITH ATTACHMENT | RECEIVED DATA | FILE PATH TO DESTINATION TO SAVE |
| PRINT | FILE PATH TO PRINTED FILE | PRINTER NAME |
| WEB ACCESS | REFERENCE URL | - |
| CLIPBOARD COPY | - | COPIED DATA |
| CLIP BOARD PASTE | PASTED DATA | - |

| OPERATION LOG GROUP NAME TABLE |||
|---|---|---|
| OPERATION TYPE | VERB | OBJECT |
| START PROCESS | EXECUTE | PROCESS NAME |
| COPY FILE | OPERATE | FILE NAME |
| MOVE FILE | OPERATE | FILE NAME |
| RENAME FILE | OPERATE | FILE NAME |
| CREATE FILE | OPERATE | FILE NAME |
| SAVE FILE | EDIT | FILE NAME |
| DELETE FILE | OPERATE | FILE NAME |
| OPEN FILE | REFERENCE | FILE NAME |
| UPLOAD FILE | SEND | FILE NAME |
| DOWNLOAD FILE | RECEIVE | FILE NAME |
| FTP TRANSMISSION | SEND | FILE NAME |
| FTP RECEPTION | RECEIVE | FILE NAME |
| SEND MAIL WITH ATTACHMENT | SEND | FILE NAME |
| RECEIVE MAIL WITH ATTACHMENT | RECEIVE | FILE NAME |
| SAVE MAIL WITH ATTACHMENT | SAVE | FILE NAME |
| PRINT | PRINT | FILE NAME |
| WEB ACCESS | REFERENCE | URL |

FIG. 10B

| OPERATION LOG GROUP NAME (WORK NAME) |
|---|
| REFERENCE CURRENT SYSTEM INFORMATION |
| UPLOAD CURRENT STATE ANALYSIS REPORT |

OPERATION LOG GROUP TABLE

| OPERATION LOG GROUP ID | OPERATION LOG GROUP NAME | OPERATION TIME/DATE | OPERATION TYPE | PROCESS NAME | INPUT INFORMATION | OUTPUT INFORMATION |
|---|---|---|---|---|---|---|
| 1 | REFERENCE current system information.doc | 2011/11/28 08:59:58 | START PROCESS | document.exe | - | - |
| 1 | REFERENCE current system information.doc | 2011/11/28 08:59:59 | OPEN FILE | document.exe | D:\ current system information.doc | - |
| 1 | REFERENCE current system information.doc | 2011/11/28 09:00:01 | ACTIVATE WINDOW | document.exe | - | - |
| 2 | UPLOAD current state analysis report.doc | 2011/11/28 10:59:59 | START PROCESS | browser.exe | - | - |
| 2 | UPLOAD current state analysis report.doc | 2011/11/28 11:00:00 | WEB ACCESS | browser.exe | http://www.yyyy.co.jp | - |
| 2 | UPLOAD current state analysis report.doc | 2011/11/28 11:00:01 | UPLOAD FILE | browser.exe | D:\ current state analysis report.doc | - |
| 2 | UPLOAD current state analysis report.doc | 2011/11/28 11:00:02 | END PROCESS | browser.exe | - | - |
| 1 | REFERENCE current system information.doc | 2011/11/28 12:00:00 | ACTIVATE WINDOW | document.exe | - | - |
| 1 | REFERENCE current system information.doc | 2011/11/28 13:00:00 | END PROCESS | document.exe | - | - |

| OPERATION LOG GROUP TIME TABLE | | | | |
|---|---|---|---|---|
| OPERATION LOG GROUP NAME (WORK NAME) | START TIME | END TIME | ACTIVE PERIOD | TOTAL ACTIVE PERIOD LENGTH |
| REFERENCE current system information.doc | 2011/11/28 08:59:59 | 2011/11/28 16:00:00 | 08:59:59 — 10:59:59, 13:00:00 — 16:00:00 | 05:00:00 |
| UPLOAD current state analysis report.doc | 2011/11/28 11:00:00 | 2011/11/28 12:00:00 | 11:00:00 — 12:00:00 | 01:00:00 |

FIG. 16B

| OPERATION LOG GROUP | OPERATION LOG GROUP NAME (WORK NAME) |
|---|---|
| G1 | REFERENCE CURRENT SYSTEM INFORMATION |
| G2 | UPLOAD CURRENT STATE ANALYSIS REPORT |
| G3 | REFERENCE www.yyyy.ne.jp/system |
| G4 | SAVE System.java |
| G5 | REFERENCE FUNCTION DESIGN SPEC |
| G6 | REFERENCE DETAILED DESIGN SPEC |

CLUSTERING

1601

| FIRST OPERATION LOG CLUSTER (TASK) ||
|---|---|
| OPERATION LOG GROUP | OPERATION LOG GROUP NAME (WORK NAME) |
| G1 | REFERENCE CURRENT SYSTEM INFORMATION |
| G2 | UPLOAD CURRENT STATE ANALYSIS REPORT |
| G3 | REFERENCE www.yyyy.ne.jp/system |

1602

| SECOND OPERATION LOG CLUSTER (TASK) ||
|---|---|
| OPERATION LOG GROUP | OPERATION LOG GROUP NAME (WORK NAME) |
| G4 | SAVE System.java |
| G5 | REFERENCE FUNCTION DESIGN SPEC |
| G6 | REFERENCE DETAILED DESIGN SPEC |

FIG. 17

| | | SUBJECT OPERATION LOG GROUP | | | | | |
|---|---|---|---|---|---|---|---|
| | | G1 | G2 | G3 | G4 | G5 | G6 |
| REFERENCE OPERATION LOG GROUP | G1 | | ○ | - | - | - | - |
| | G2 | × | | ○ | × | - | - |
| | G3 | - | - | | - | - | - |
| | G4 | - | × | - | | ○ | ○ |
| | G5 | - | - | - | × | | - |
| | G6 | - | - | - | - | - | |

FIG. 21

| USER TABLE ||| 217 |
|---|---|---|
| USER | PROJECT CODE | TASK FAMILY |
| UserA | PJ1 | PRODUCTION |
|  | PJ2 | PRODUCTION |
| UserB | PJ3 | RESEARCH AND DEVELOPMENT |
| UserC | PJ4 | SALES |

| TASK TABLE | | | | |
|---|---|---|---|---|
| TASK FAMILY | TASK NAME | TASK DESCRIPTION | STEP NO. | |
| PRODUCTION | CURRENT STATE ANALYSIS | CHECKING PROCESSING OF SYSTEM FORMULATION | 1 | 2201 |
| PRODUCTION | FRAMEWORK DESIGN | CONCEPT DESIGN OF NEW SYSTEM | 2 | |
| PRODUCTION | FUNCTION DESIGN | RELIABILITY DESIGN, SAFETY DESIGN | 3 | 2202 |
| PRODUCTION | DETAILED DESIGN | PROGRAM DESIGN | 4 | |
| PRODUCTION | SYSTEM CONFIGURATION | PROGRAMMING | 5 | |
| PRODUCTION | SYSTEM TEST | OPERATION CHECK, CONSISTENCY CHECK | 6 | |
| PRODUCTION | MAINTENANCE | MAINTENANCE OF PROGRAMS AND EQUIPMENT | 7 | |
| PRODUCTION | TROUBLESHOOTING | PERFORMANCE CHECK, FAILURE CHECK | 8 | |
| SALES | CLIENT SELECTION | MARKET DATA ASSESSMENT | 1 | |
| SALES | FIRST APPROACH | TELEPHONE APPOINTMENT, WALK-IN SALES | 2 | |
| SALES | VISIT, SALES NEGOTIATION | PREPARATION OF COMPANY BROCHURE AND RELATED DOCUMENTATION | 3 | |
| SALES | CONTRACT, MEETING | PREPARATION OF SAMPLES AND COST STATEMENT | 4 | |
| SALES | ORDER ACCEPTANCE | PREPARATION OF WORK SCHEDULE AND TABLE OF NORMAL DEVELOPMENTAL STAGES | 5 | |
| SALES | DELIVERY | PREPARATION OF INSPECTION STANDARD AND INVOICE | 6 | |
| SALES | FOLLOW-UP SERVICE | PREPARATION OF SUPPORT SHEET AND THANK-YOU LETTER | 7 | |
| SALES | BILLING, COLLECTION | CHECK OF BILLS AND ACCOUNT INFORMATION | 8 | |
| ... | ... | ... | ... | |
| OTHERS | OTHERS | OTHER TASKS | 1 | |

FIG. 23

TASK ANALYSIS RESULT TABLE 220

| WORKING DATE | USER | TASK FAMILY | PROJECT CODE | TASK NAME | WORKING TIME |
|---|---|---|---|---|---|
| 2011/11/26 | User A | PRODUCTION | PJ1 | CURRENT STATE ANALYSIS | 05:00:00 |
| 2011/11/26 | User A | PRODUCTION | PJ2 | DETAILED DESIGN | 02:00:00 |
| 2011/11/26 | User B | RESEARCH AND DEVELOPMENT | PJ3 | DEVELOPMENT REPORT | 06:00:00 |
| 2011/11/26 | User C | SALES | PJ4 | CLIENT SELECTION | 07:00:00 |
| 2011/11/27 | User A | PRODUCTION | PJ1 | CURRENT STATE ANALYSIS | 03:00:00 |
| 2011/11/27 | User A | PRODUCTION | PJ2 | DETAILED DESIGN | 04:00:00 |
| 2011/11/27 | User B | RESEARCH AND DEVELOPMENT | PJ3 | DEVELOPMENT REPORT | 07:00:00 |
| 2011/11/27 | User C | SALES | PJ4 | CLIENT SELECTION | 05:00:00 |

| CONFIGURATION OF FIRST OPERATION LOG CLUSTER (TASK) ||||
|---|---|---|---|
| OPERATION LOG GROUP NAME (WORK NAME) | OPERATION TYPE | PROCESS NAME | EXTERNAL INFORMATION |
| REFERENCE CURRENT SYSTEM INFORMATION | REFERENCE | document.exe | http://www.zzzz.co.jp/genjyo |
| UPLOAD CURRENT STATE ANALYSIS REPORT | UPLOAD | browser.exe | http://www. zzzz.co.jp/bunseki |
| REFERENCE www.yyyy.ne.jp/system | REFERENCE | browser.exe | http://www.yyyy.ne.jp/system |

| CONFIGURATION OF SECOND OPERATION LOG CLUSTER (TASK) ||||
|---|---|---|---|
| OPERATION LOG GROUP NAME (WORK NAME) | OPERATION TYPE | PROCESS NAME | EXTERNAL INFORMATION |
| SAVE System.java | SAVE | document.exe | - |
| REFERENCE FUNCTION DESIGN SPEC | REFERENCE | document.exe | http://www.zzzz.co.jp/kinou |
| REFERENCE DETAILED DESIGN SPEC | REFERENCE | document.exe | http://www.zzzz.co.jp/syosai |

| | | LEARNING TABLE | | | |
|---|---|---|---|---|---|
| TASK FAMILY | TASK NAME | OPERATION TYPE | PROCESS NAME | EXTERNAL INFORMATION | NUMBER OF APPEAR- ANCES |
| PRODUC- TION | CURRENT STATE ANALYSIS | REFERENCE | document.exe | http://www. zzzz.co.jp/genjyo | 2 |
| PRODUC- TION | CURRENT STATE ANALYSIS | UPLOAD | browser.exe | http://www. zzzz.co.jp/bunseki | 3 |
| PRODUC- TION | FRAMEWORK DESIGN | REFERENCE | document.exe | http://www. zzzz.co.jp/bunseki | 2 |
| PRODUC- TION | FRAMEWORK DESIGN | UPLOAD | browser.exe | http://www. zzzz.co.jp/gaiyo | 2 |
| PRODUC- TION | FUNCTION DESIGN | REFERENCE | document.exe | http://www. zzzz.co.jp/gaiyo | 3 |
| PRODUC- TION | FUNCTION DESIGN | UPLOAD | browser.exe | http://www. zzzz.co.jp/kinou | 3 |
| PRODUC- TION | DETAILED DESIGN | REFERENCE | document.exe | http://www. zzzz.co.jp/kinou | 3 |
| PRODUC- TION | DETAILED DESIGN | UPLOAD | browser.exe | http://www. zzzz.co.jp/syosai | 3 |
| PRODUC- TION | SYSTEM CONFIGU- RATION | REFERENCE | document.exe | http://www. zzzz.co.jp/kinou | 4 |
| PRODUC- TION | SYSTEM CONFIGU- RATION | REFERENCE | document.exe | http://www. zzzz.co.jp/syosai | 4 |
| PRODUC- TION | SYSTEM CONFIGU- RATION | SEND | ftp.exe | ftp://src | 1 |
| PRODUC- TION | SYSTEM TEST | REFERENCE | ftp.exe | ftp://src | 4 |
| PRODUC- TION | SYSTEM TEST | REFERENCE | spreadsheet.exe | http://www. zzzz.co.jp/cl | 4 |
| PRODUC- TION | MAINTE- NANCE | REFERENCE | document.exe | http://www. zzzz.co.jp/hosyu | 4 |
| PRODUC- TION | TROUBLE- SHOOTING | REFERENCE | document.exe | http://www. zzzz.co.jp/hokoku | 1 |
| ... | ... | ... | ... | ... | ... |

FIG. 26

| | | ENTRIES SELECTED FROM LEARNING TABLE | | | |
|---|---|---|---|---|---|
| TASK FAMILY | TASK NAME | OPERATION TYPE | PROCESS NAME | EXTERNAL INFORMATION | NUMBER OF APPEARANCES |
| PRODUCTION | CURRENT STATE ANALYSIS | REFERENCE | document.exe | http://www.zzzz.co.jp/genjyo | 2 |
| PRODUCTION | CURRENT STATE ANALYSIS | UPLOAD | browser.exe | http://www.zzzz.co.jp/bunseki | 3 |
| PRODUCTION | FRAMEWORK DESIGN | REFERENCE | document.exe | http://www.zzzz.co.jp/bunseki | 2 |
| PRODUCTION | FRAMEWORK DESIGN | UPLOAD | browser.exe | http://www.zzzz.co.jp/gaiyo | 2 |
| PRODUCTION | FUNCTION DESIGN | REFERENCE | document.exe | http://www.zzzz.co.jp/gaiyo | 3 |
| PRODUCTION | FUNCTION DESIGN | UPLOAD | browser.exe | http://www.zzzz.co.jp/kinou | 3 |
| ⋮ | ⋮ | ⋮ | ⋮ | ⋮ | ⋮ |

FIG. 27

| RESULTS OF PROBABILITY CALCULATION |||||||
|---|---|---|---|---|---|---|
| OPERATION LOG CLUSTER | PJ1 || PJ2 ||||
| | CURRENT STATE ANALYSIS | FRAMEWORK DESIGN | FUNCTION DESIGN | DETAILED DESIGN | SYSTEM CONFIGURATION | OTHERS |
| FIRST OPERATION LOG CLUSTER (FIRST TASK) | 0.006 | 0.000 | 0.000 | 0.000 | 0.000 | 0.000 |
| SECOND OPERATION LOG CLUSTER (SECOND TASK) | 0.000 | 0.000 | 0.000 | 0.002 | 0.005 | 0.000 |

RESULT OF TASK ANALYSIS

2811

2011/11/28  UserA

2812

| TASK FAMILY | PROJECT CODE | TASK NAME | WORKING TIME |
|---|---|---|---|
| PRODUCTION | PJ1 | CURRENT STATE ANALYSIS | 06:00:00 |
| PRODUCTION | PJ2 | SYSTEM CONFIGURATION | 07:30:02 |

LOG MANAGEMENT SYSTEM AND PROGRAM

BACKGROUND OF THE INVENTION

This invention relates to a log management system and a program and, in particular, relates to a technique to analyze and manage a log in a client computer.

For a computer system in which client computers operated by users (operators) and a server computer are connected to be able to communicate with one another via a network, there is a demand to grasp the history of various operations in the client computers by collecting and watching logs generated by the client computers.

In recent years, there also exists an increasing need to grasp the activities of users in the background for improving working efficiency and enhancing compliance. To give an example, there is a need to monitor the activities of users through the operations on client computers by the users. For example, JP 2002-208050 A (Patent Literature 1) discloses calculating working time of an operator based on entering and leaving data or login and logout data.

Patent Literature 1: JP 2002-208050 A

SUMMARY OF THE INVENTION

In order to grasp the activities of users, it is necessary to collect and analyze operation logs (logs generated because of user operations) of client computers operated by the users. For the work administrator to properly grasp the activities of the users but to reduce the workload therefor, demanded is a management system that can analyze the users' operation logs more pertinently to achieve more proper management of the activities of the users.

An aspect of the invention is a log management system for analyzing and managing a log acquired in a computer, including a processor and a storage device. The storage device stores a log of the computer. The processor generates a plurality of log groups each formed of a plurality of log records with reference to the log stored in the storage device. The processor identifies active periods, in each of which a display area is active, in the plurality of log groups. The processor compares a start-to-end period from a start time to an end time of a reference log group selected from the plurality of log groups with active periods of subject log groups other than the reference operation log group individually to identify one or more subject log groups having an active period included in the start-to-end period. The processor individually determines whether to include the identified one or more subject log groups in the same first cluster as the reference log group, based on an active period length of each of the identified one or more subject log groups within the start-to-end period.

An aspect of the invention provides more pertinent analysis of a log of a computer operated by a user and more proper management of the activities of the user, so that the work administrator can pertinently grasp the activities of the user and reduce the workload therefor.

BRIEF DESCRIPTION OF THE DRAWINGS

FIG. 4 exemplifies an operation log DB in Embodiment 1;

FIG. 5 exemplifies an association definition table in Example 1;

FIG. 10A exemplifies an operation log group name table in Embodiment 1;

FIG. 10B shows operation log group names assigned to operation log groups by a method according to Embodiment 1;

FIG. 12 exemplifies an operation log group table for storing operation log groups generated by the task analysis program in Embodiment 1;

FIG. 14 exemplifies an operation log group time table obtained by time calculation on the operation log groups shown in FIG. 13 in Embodiment 1;

FIG. 16B illustrates an example of generating two operation log clusters from six operation log groups in Embodiment 1;

FIG. 17 shows results of determination of clustering explained with reference to FIGS. 16A and 16B in Embodiment 1;

FIG. 21 illustrates an exemplary configuration of a user table in Embodiment 1;

FIG. 22 illustrates an exemplary configuration of a task table in Embodiment 1;

FIG. 23 illustrates an exemplary configuration of a task analysis result table in Embodiment 1;

FIG. 24A illustrates an exemplary configuration of an operation log cluster generated from an operation log of a designated user and a designated date in Embodiment 1;

FIG. 24B illustrates an exemplary configuration of an operation log cluster generated from an operation log of a designated user and a designated date in Embodiment 1;

FIG. 25 illustrates an exemplary configuration of a learning table in Embodiment 1;

FIG. 26 shows entries selected from the learning table for probability calculation on the operation log of the designated user and the designated date in Embodiment 1;

FIG. 27 shows results of probability calculation on candidate task names for two operation log clusters in Embodiment 1; and FIG. 28 shows an exemplary display image showing results of task analysis in Embodiment 1.

DETAILED DESCRIPTION OF THE EMBODIMENTS

Figure 1:
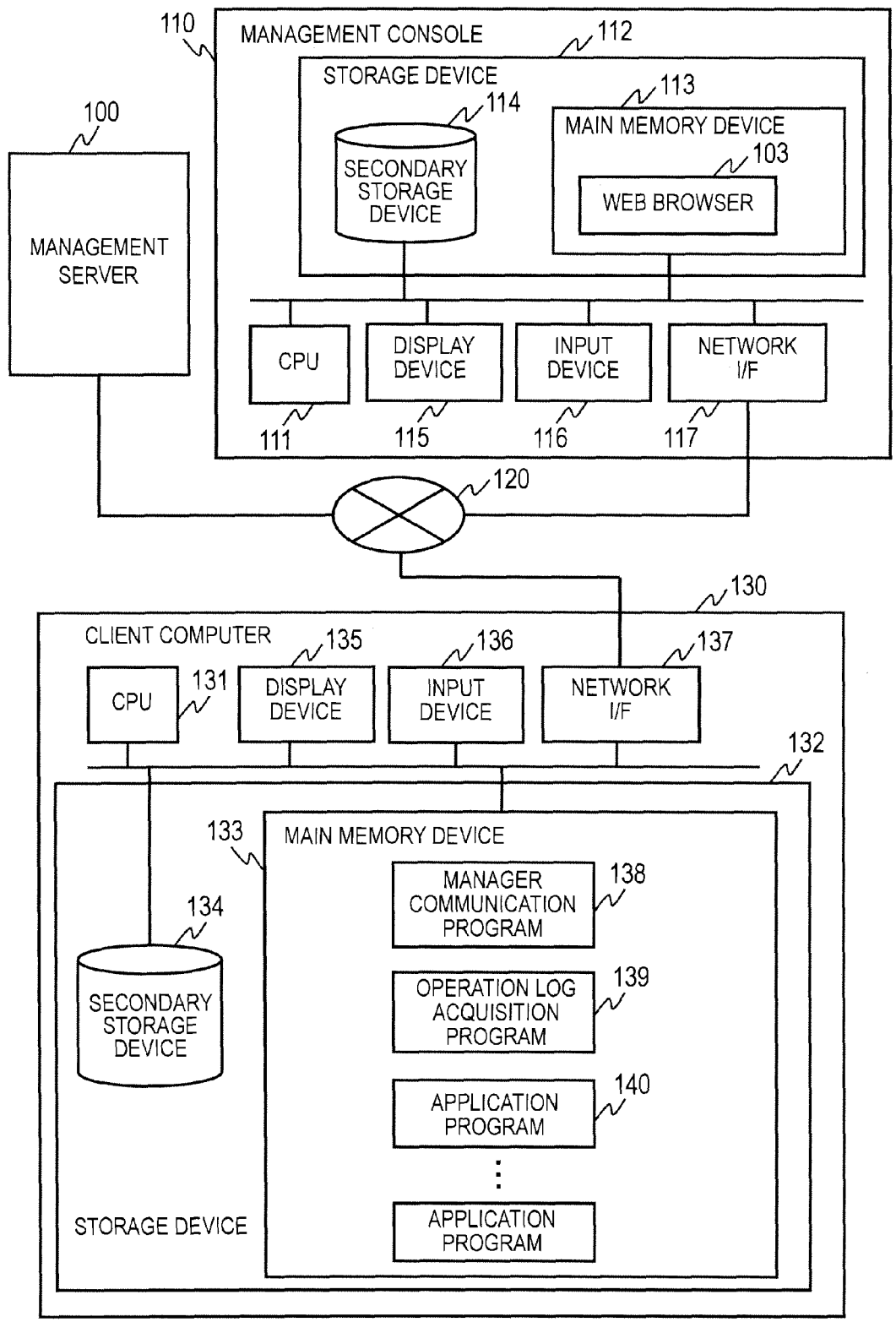
FIG. 1 schematically illustrates an exemplary configuration of a computer system including a client computer and a management system for the client computer in Embodiment 1.

Hereinafter, embodiments of this invention will be described with reference to the accompanying drawings. For clarity of explanation, the following description and the drawings contain omissions and simplifications as appropriate. Management systems in the embodiments manage a client computer (a user), using an operation log(a log generated because of user operations) acquired from the client computer.

A management system in an embodiment of this invention groups a plurality of operation log records acquired from the operation log in the client computer into a plurality of operation log groups. The management system further joins a plurality of related operation log groups into a cluster (also referred to as an operation log cluster).

In typical, when a user carries out different work in parallel by different programs, operation log groups for the different pieces of work are generated. Among these operation log groups, their periods from the start to the end (also referred to as start-to-end periods) are overlapped. If the relationship of these operation log groups are close, these operation log groups can be included in the same cluster to allow more pertinent analysis of the working state of the user and management based thereon. The work administrator and the user can refer to the results of the analysis by the management system to grasp the user's activities easily and properly.

Specifically, the management system compares active periods in each operation log group with the period from the start time to the end time of a reference operation log group to individually determine whether each of the operation log groups is related to the reference operation log group. The active period is a period in which a display area is active.

The display area is an area where a process or a thread shows images to a user, for example, a window or a tab page. When a display area is selected, the display area becomes active and the other display areas become inactive (also referred to as passive). In typical, the number of active areas at a given time is one.

In typical, an active period is a period from a time at which an operation log record indicates start of a process or activation of a window to a time at which another operation log record indicates end of the process or deactivation of the window. An operation log group may include a plurality of distant active periods.

The management system can determine whether an operation log group and a reference operation log group belong to the same cluster based on the length of the active periods of the operation log group included in the start-to-end period of the reference operation log group.

If the length of the active periods of the operation log group included in the start-to-end period of the reference operation log group is long and a value obtained from the length of the active periods is in a specified range, the management system determines that the operation log group and the reference operation log group are included in the same cluster. Forming such a cluster from related operation log groups joins related operation log records to achieve precise grasp of a user's activities.

Embodiment 1

Hereinafter, management of a client computer in this embodiment will be specifically described with reference to the accompanying drawings. FIG. 1 schematically illustrates an exemplary configuration of a computer system in this embodiment, including a client computer operated by a user and a management system for the client computer. The management system includes a management server 100 and a management console 110. By way of example, FIG. 1 shows one client computer 130 from which an operation log is to be acquired, but typically, a plurality of client computers are to be managed by the management system. The computers are connected by a network 120 to be able to communicate with one another.

The management console 110 is a computer used by the administrator to manage the client computer 130. The administrator accesses the management server 100 from the management console 110 to instruct the management server 100 on processing, and controls the management console 110 to acquire and display results of processing by the management server 100. This way, the administrator uses the management console 110 to perform management based on the operation log of the client computer 130. The management system does not need to include the management console 110, and the administrator may use an input/output device directly connected to the management server 100, instead of the management console 110.

As illustrated in FIG. 1, the management console 110 includes a CPU 111, which is a processor, a storage device 112, a display device 115, an input device 116, and a network interface 117. The management console 110 connects to the network 120 through the network interface 117.

The storage device 112 includes a main memory device 113 and a secondary storage device 114. The main memory device 113 is typically a volatile semiconductor memory, and stores a web browser 103, which is a program. The administrator can use the web browser 103 to access and operate the management server 100.

The CPU 111 operates as functional parts for realizing predetermined functions by executing programs stored in the main memory device 113. The programs to be executed include, in addition to the web browser 103 shown in FIG. 1, an operating system (OS) (not shown).

For convenience of description, the web browser 103 is illustrated in the main memory device 113, but typically, the web browser 103 is loaded from a storage area of the secondary storage device 114 to a storage area of the main memory device 113. The secondary storage device 114 is a storage device including a non-volatile, non-transitory storage medium for storing programs and data necessary for realizing predetermined functions. The secondary storage device 114 may alternatively be an external storage device connected through the network 120.

Typical examples of the input device 116 are a keyboard and a pointer device, but may alternatively be a device other than the keyboard and the pointer device. The display device 115 is typically a display monitor, and displays results of processing in the management server 100. The client computer 130 is a computer used by the user, and is to be managed by the management system. The client computer 130 acquires the operation log of the user who uses the client computer 130, and transmits the acquired operation log to the management server 100.

As illustrated in FIG. 1, the client computer 130 includes a CPU 131, which is a processor, a storage device 132, a display device 135, an input device 136, and a network interface 137. The client computer 130 connects to the network 120 through the communication interface 137. Typical examples of the input device 136 are a keyboard and a pointer device and the display device 135 is typically a display monitor, but the input device 136 and the display device 135 may alternatively be a device other than the keyboard and the pointer device, and a device other than the display monitor, respectively.

The storage device 132 includes a main memory device 133 and a secondary storage device 134. The main memory device 133 is typically a volatile semiconductor memory, and stores, in addition to an OS (not shown), a manager communication program 138, an operation log acquisition program 139, and a plurality of application programs 140. Those programs are parts of an operation log client program, and operation of each program will be described later in detail.

The CPU 131 realizes predetermined functions by executing programs stored in the main memory device 133. For example, the CPU 131 operates in accordance with the operation log acquisition program 139 to operate as an operation log acquisition part. The same applies to the other programs. The client computer 130 is a device or a system including those functional parts.

For convenience of description, the programs 138 to 140 are shown in the main memory device 133, but typically, the programs 138 to 140 are loaded from a storage area of the secondary storage device 134 to a storage area of the main memory device 133. The secondary storage device 134 is a storage device including a non-volatile, non-transitory storage medium for storing programs and data necessary for realizing predetermined functions. The secondary storage device 134 may alternatively be an external storage device connected through the network 120.

Figure 2:
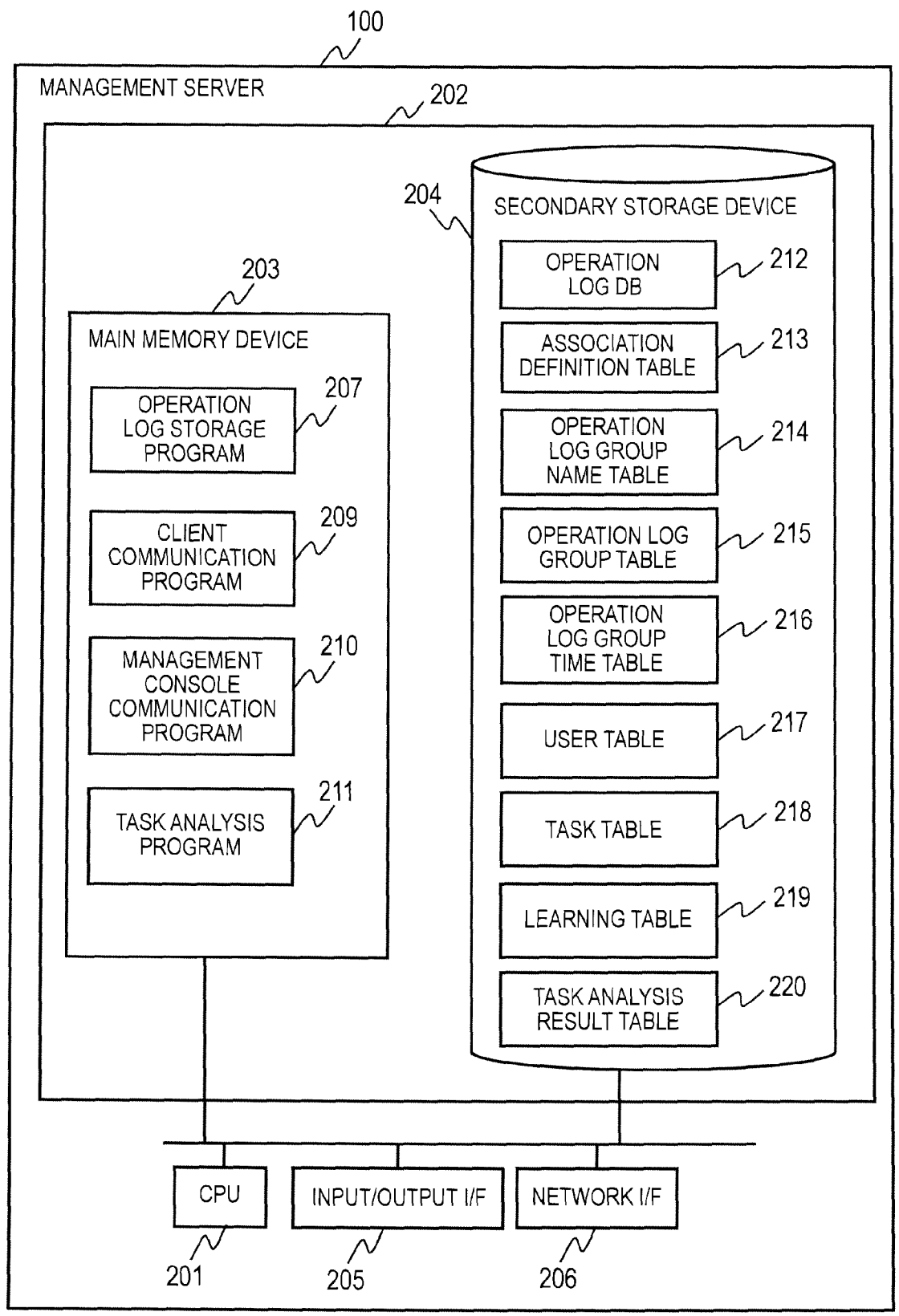
FIG. 2 schematically illustrates an exemplary configuration of a management server in Embodiment 1.

FIG. 2 schematically illustrates a configuration of the management server 100. The management server 100 is a computer, and includes a CPU 201, which is a processor, a storage device 202, an input/output interface 205, and a network interface 206. The management server 100 connects to the network 120 through the network interface 206.

The storage device 202 includes a main memory device 203 and a secondary storage device 204. The main memory device 203 is typically a volatile semiconductor memory, and stores, in addition to an OS (not shown), an operation log storage program 207, a client communication program 209, a management console communication program 210, and a task analysis program 211. Those programs are parts of an operation log management program, and operation of each program will be described later in detail.

The secondary storage device 204 is a storage device including a non-volatile, non-transitory storage medium for storing programs and data necessary for realizing predetermined functions. In FIG. 2, the secondary storage device 204 holds an operation log database (DB) 212, an association definition table 213, an operation log group name table 214, an operation log group table 215, an operation log group time table 216, a user table 217, a task table 218, a learning table 219, and a task analysis result table 220.

These pieces of information are operation log management data. The field values are associated with one another in each entry of the DB or the tables. The stored information will be described later in detail. The secondary storage device 204 may alternatively be an external storage device connected through the network 120.

For convenience of description, the programs 207, and 209 to 211 are shown in the main memory device 203, and the pieces of information (data) 212 to 220 necessary for the processing in the management server 100 are shown in the secondary storage device 204. However, typically, these programs and pieces of information (data) are loaded from a storage area of the secondary storage device 204 to a storage area of the main memory device 203 to be used by the CPU 201.

The CPU 201 realizes predetermined functions by executing programs while using data stored in the main memory device 203. For example, the CPU 201 operates in accordance with the operation log storage program 207, the client communication program 209, the management console communication program 210, and the task analysis program 211 to function as an operation log storage part and an operation log grouping part, a client communication part, a management console communication part, and a task analysis part, respectively. The management server 100 is a device or a system including those functional parts.

In the example of FIGS. 1 and 2, the management server 100 is one computer, but alternatively, a plurality of computers may perform processing equivalent to that performed by the management server 100 to increase the speed and reliability of the processing for the management. Those computers are included in the management system in this embodiment. The client computer 130 may play a partial role in the management, and the management system may include (some functions of) the client computer.

As described above, the programs of the management server 100, the management console 110, and the client computer 130 are executed by the CPUs 201, 111, and 131 to perform predetermined processing using the storage devices 202, 112, and 132, and other devices. Therefore, a description made with a subject of a program in this embodiment may be a description with a subject of the CPU 201, 111, or 131. Alternatively, processing performed by a program is processing performed by the computer 100, 110, or 130 on which the program runs or by the computer system including the computers 100, 110, and 130.

As described above, the client computer 130 acquires an operation log of operations performed thereon by the user, and transmits the acquired operation log to the management server 100. Specifically, the operation log acquisition program 139 running on the client computer 130 acquires operation information (an operation log) on the application programs 140. The method of processing by the operation log acquisition program 139 is generally known and not a feature of this invention by itself, and hence a detailed description thereof is omitted here.

Figure 3:
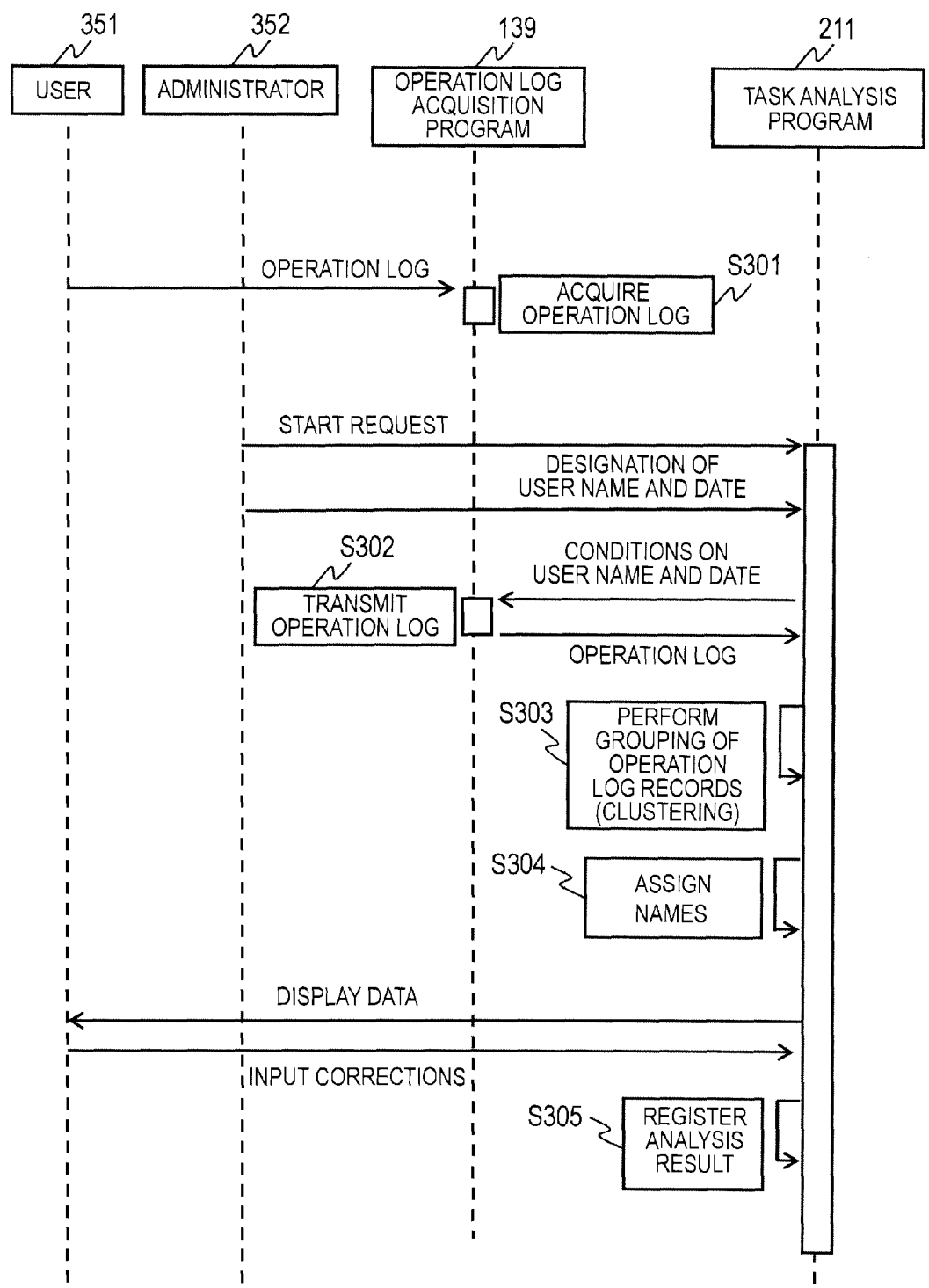
FIG. 3 is a sequence diagram illustrating exemplary operations of the computer system in Embodiment 1.

FIG. 3 is a sequence diagram illustrating exemplary operations in the computer system in this embodiment. A user 351 operates the client computer 130 and the operation log acquisition program 139 acquires an operation log of the user (S301). The administrator 352 requests the management server 100 to start the task analysis program 211, using the input device 116 in the management console 110. The start request includes designation of a user name for identifying the user and a date of the operation log to be analyzed.

In this example, it is assumed that the number of client computers operated by users is one. The task analysis program 211 may start its analysis without a request from the administrator. For example, it may start the analysis at a scheduled time on each day.

The task analysis program 211 has information to associate a user name with a client computer operated by the user and requests the client computer 130 to transmit an operation log with reference to the information. This request is sent by the client communication program 209 and includes the aforementioned designation of user name and date.

The manager communication program 138 of the client computer 130 selects an operation log identified by the designated user name and date from the operation log acquired by the operation log acquisition program 139 and transmits it to the management server 100 through the network interface 137 and the network 120 (S302).

The client computer 130 may transmit an operation log that has not been sent to the management server 100 and the management server 100 may select a required operation log. The client computer 130 may transmit an operation log at a scheduled time without a request from the management server 100.

The task analysis program 211 stores the received operation log to the operation log DB 212, using different programs. Specifically, in the management server 100, the client communication program 209 receives the operation log transmitted from the client computer 130 through the network interface 206. The client communication program 209 passes the received operation log to the operation log storage program 207. The operation log storage program 207 stores the received operation log in the operation log DB 212.

The task analysis program 211 acquires operation log records of the designated user name and date from the operation log DB 212 and analyzes them. Specifically, the task analysis program 211 performs grouping of the operation log records (S303). The grouping generates operation log groups each formed of a plurality of operation log records and further generates operation log clusters each formed of one or more operation log groups. The operation log cluster is a group of one or more operation log records. Details of the grouping will be described later.

Thereafter, the task analysis program 211 assigns names to the operation log clusters obtained by grouping (S304). In this example, the names are the names of tasks for the user. Details of the assignment of a name will be described later.

The task analysis program 211 transmits the results of analysis, which are display data indicating the results of the grouping and the name assignment, to the client computer 130 using the client communication program 209. The user 351 checks the results with the display device 135 and if some correction is necessary, the user 351 inputs data indicating the correction with the input device 136. The manager communication program 138 transmits a request for necessary corrections to the management server 100. The task analysis program 211 also transmits the results of analysis in response to a request from the administrator 352.

The task analysis program 211 registers the appropriately corrected analysis results. Specifically, the task analysis program 211 updates the learning table 219 and the task analysis result table 220 with the analysis results (S305). Details of this step will be described later.

As explained with reference to FIG. 3, the operation log storage program 207 in the management server 100 acquires data to be stored in the operation log DB 212 from the received operation log and stores the data in the operation log DB 212. FIG. 4 exemplifies the operation log DB 212 in this embodiment. In this example, the operation log DB 212 is represented by one table.

The operation log DB 212 in this example includes a column of operation dates/times, a column of operation types, a column of machine names, a column of user names, a column of process IDs, a column of process names, a column of input information, and a column of output information. The operation log DB 212 may further include not-illustrated information.

The operation date/time indicates the date and time when an operation was performed. The operation type indicates a type of the operation performed by the user. This example provides, for example, operation types such as log on, start process, open file, activate window, and deactivate window.

The machine name is a name of the client computer on which the operation was performed. The machine name is a unique identifier for identifying client computers, and if a plurality of client computers exist, the plurality of client computers are assigned different machine names.

The user name indicates a name of the user who logged in and performed the operation. If a plurality of users exist, the user name is a unique identifier in one client computer 130; different user names are assigned to different users of the one client computer 130. If a plurality of client computers exist, it is typical that user names are unique to all the client computers.

The process ID is an identifier for identifying a process on which the operation was performed. The process is an instance of a program. A plurality of processes generated from the same program can run in parallel. The operation log acquisition program 139 may obtain a value of the process ID from, for example, the OS. For example, the process IDs are monotonously increasing numbers and are assigned to the processes in accordance with the chronological order in which the processes are generated. For example, numbers from a minimum value to a maximum value are assigned repeatedly in order.

The process name is a name of a process and may include, for example, the name or a part of the name of a program. For example, in this example, browser.exe is a process name of a web browser and document.exe is a process name of a word processor.

Operation log records having the same process ID may have different operation types. The input information is information for identifying an input received from the operation. Similarly, the output information is information for identifying an output generated from the operation. Details of the input information and the output information will be described later. This example performs grouping of operation log records using the process ID, the input information, and the output information.

In the example of FIG. 4, the plurality of operation log records (entries) included in the operation log DB 212 are arrayed in order of the operation date/time from the earliest to the latest. Some of the operation log records have data specifically identifying details of the records in all of the fields; however, the rest of the operation log records do not contain such data in some fields (fields indicated by hyphens). Typically, those fields contain a NULL value.

Specifically, every operation log record contains specific data (data other than NULL) in the operation date/time, the operation type, the machine name, and the user name. Some operation log records do not contain the value of the process ID. Specifically, there is no specific process associated with a logon operation (and a logoff operation). Therefore, those operation log records do not contain a specific process ID and a specific process name.

In the example of FIG. 4, some of the operation log records have specific input information or specific output information, and the others of the operation log records have neither input information nor output information. Specifically, for the operations of web access and open file, specific inputs are defined; information (identifiers) indicating the inputs are held in the operation log records.

This example shows an operation log of operations by one user (user name: UserA) on one client computer 130 (machine name: PC1). However, if a plurality of client computers or a plurality of users are present, the operation log DB 212 stores operation logs for all the plurality of client computers or the plurality of users.

As described above, the operation log storage program 207 of the management server 100 obtains data of the operation log records from the operation log received from the client computer 130, and stores the obtained data in the operation log DB 212. In this configuration example, the operation log storage program 207 refers to the association definition table 213 to identify input information and output information of each operation.

FIG. 5 exemplifies the association definition table 213. This association definition table 213 is merely an example, and the association definition table 213 may include further operation types, or may include further definitions of information associated with the operation types. The association definition table 213 in this example includes a column of operation types, a column of input information, and a column of output information. The columns of input information and output information each define the types of information for the individual operation types.

As shown in FIG. 5, either one or both of the input information and the output information are defined for some of the operation types, while neither the input information nor the output information is defined (meaning that no information is defined to exist) for the others of the operation types. For those operations, input and output information do not exist.

The operation types defined in the association definition table 213 are the same as the operation types registered in the operation log DB 212. For example, all the operation types that can be stored in the operation log DB 212 have definitions for their input and output information (including non-existence thereof) in the association definition table 213.

For example, for the operation types "activate window" and "deactivate window", neither input information nor output information is defined. The activate window operation is an operation to allow user operations on a window (computer operations) by starting a process or selecting a window.

The deactivate window operation is an operation to change an active window into non-active (passive) one. The active window is deactivated by ending a process or selecting a display area different from the window.

In another example, the input information for the operation type "open file" is a path to the opened file. It should be noted that, in the exemplary configuration described in this embodiment, a file path is a full path to the file and includes directory information (a storage address) and a file name (which does not include directory information). For the open file operation, output information is not defined.

In still another example, the input information for the operation type "upload file" is a file path to the upload source. Output information is not defined. The output information for the operation type "download file" is a file path to the destination to save. For the operation type "web access", input information is defined as reference URL. The output information is not defined. Information associated with the operation type "web access" may be defined by a part of the URL. The same applies to URLs for other operation types.

In addition, in the association definition table 213 of FIG. 5, output information is defined for the operation type "clipboard copy", and input information is defined for the operation type "clipboard paste". A clipboard copy operation includes an operation of maintaining copy source data (so-called copy operation) and an operation of deleting the copy source data (so-called cut operation). The defined input information and the defined output information are copied data and pasted data, respectively.

As the input or output information associated with an operation type, appropriate information is used depending on the design. For example, as described above, in addition to the full path of data and the data itself, a hash value of data may be used. In the case of the clipboard, a program for clipboard sequentially assigns identifiers to copy operations and cut operations, and the assigned identifiers may be used as the above-mentioned input information and output information.

The operation log storage program 207 determines the input information and the output information for one operation (operation log record) in the operation log received from the client computer 130 with reference to the association definition table 213. The operation log storage program 207 acquires the input information and the output information defined for the selected operation from the received operation log, and stores them in the operation log DB 212.

Typically, an operation log transmitted from the client computer 130 contains more detailed information on user operations than information to be stored in the operation log DB 212. For example, the operation log storage program 207 determines, from a plurality of events (entries) included in the received operation log, operation types corresponding to those events in accordance with the definition information, and extracts, from those events, the other data (information) to be stored in the operation log DB 212.

The operation log storage program 207 stores the thus-generated operation log records (specifically, data thereof) in the operation log DB 212. The operation log acquisition program 139 of the client computer 130 may transmit the operation log including values of the fields of the operation log records of the operation log DB 212 to the management server 100. The operation log storage program 207 may select operation log records (specifically, data thereof) from the received operation log and store the selected operation log records in the operation log DB 212. The operation log acquisition program 139 may transmit only the data to be stored in the operation log DB 212 to the management server 100.

In this example, information for associating the operation type with the input information and output information therefor is provided in the association definition table 213 of FIG. 5. However, the definition information for associating the operation type with the information does not need to be included in one table, and may have any data structure. The definition information may be included in the operation log storage program 207, not in the form of a table.

The same applies to any information used in the client computer management by the management system in this embodiment. Specifically, information contained in the operation log DB 212, the association definition table 213, the operation log group name table 214, the operation log group table 215, the operation log group time table 216, the user table 217, the task table 218, the learning table 219, and the task analysis result table 220 may be represented by any data structure. Accordingly, information does not depend on the data structure in this embodiment. To describe the substance of information, identification information, identifier, name, ID, and the like are used, but they can be replaced with one another.

Figure 6:
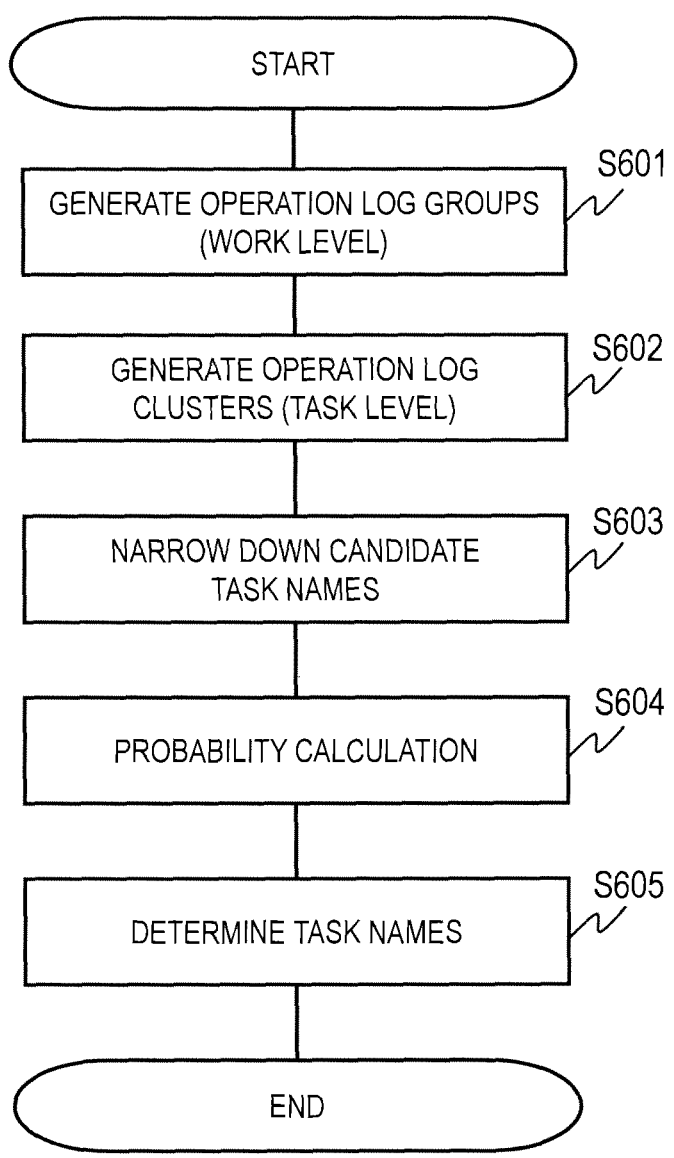
FIG. 6 is a flowchart illustrating exemplary processing by a task analysis program to perform grouping of operation log records and assign task names in Embodiment 1.

As explained with reference to FIG. 3, the task analysis program 211 acquires operation log records of the designated user and date from the operation log DB 212 and performs grouping of the log records (S303). Furthermore, the task analysis program 211 assigns task names to the operation log clusters generated by the grouping (S304). FIG. 6 is a flowchart illustrating exemplary processing by the task analysis program 211 to perform grouping of operation log records S303 and to assign names S304.

The task analysis program 211 generates operation log groups each formed of a plurality of operation log records (S601). In this example, it is presumed that each operation log group corresponds to a piece of work. The task analysis program 211 further generates operation log clusters from the operation log groups generated at S601 (S602). An operation log cluster is formed of a plurality of operation log groups. In this example, it is presumed that each operation log cluster corresponds to one task.

An operation log cluster consists of a plurality of operation log records and is a group of operation log records, like an operation log group. In this example, to distinguish the group of operation log records generated at step S601 from the group of operation log records generated at step S602, the former is referred to as operation log group and the latter is referred to as operation log cluster. The steps S601 and S602 correspond to the grouping of operation log records S303 in FIG. 3.

Next, the task analysis program 211 narrows down candidate task names to assign a name (task name) to each operation log cluster (S603) and further performs probability calculation to determine the task name (S604). The task analysis program 211 determines the task name to be assigned to the operation log cluster based on the results of the probability calculation S604 (S605). The steps S603 to S605 correspond to the assigning names S304 in the sequence diagram of FIG. 3.

As illustrated in the flowchart of FIG. 6, the task analysis program 211 generates operation log groups each corresponding to a piece of work in grouping of operation log records (S601), and further, generates operation log clusters each corresponding to a task (S602). First, a method of generating operation log groups (S601) will be described in detail.

Figure 7:
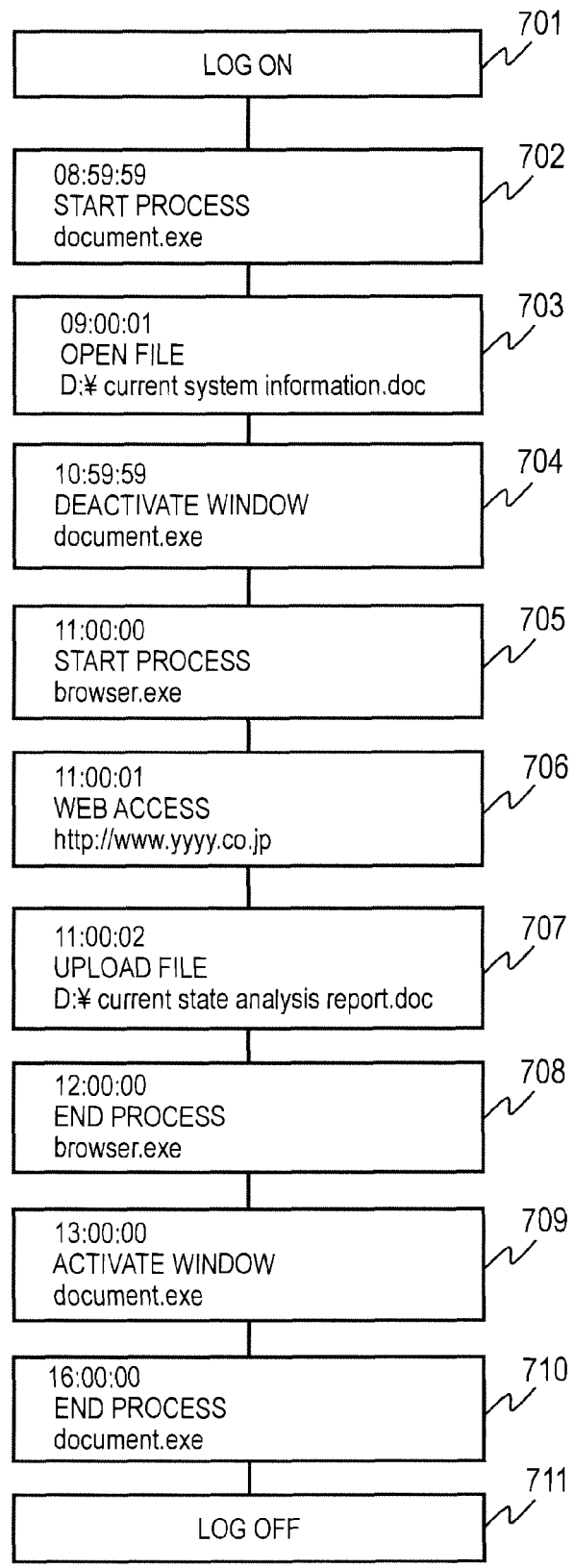
FIG. 7 shows exemplary operation log records to be analyzed in Embodiment 1.
Figure 8:
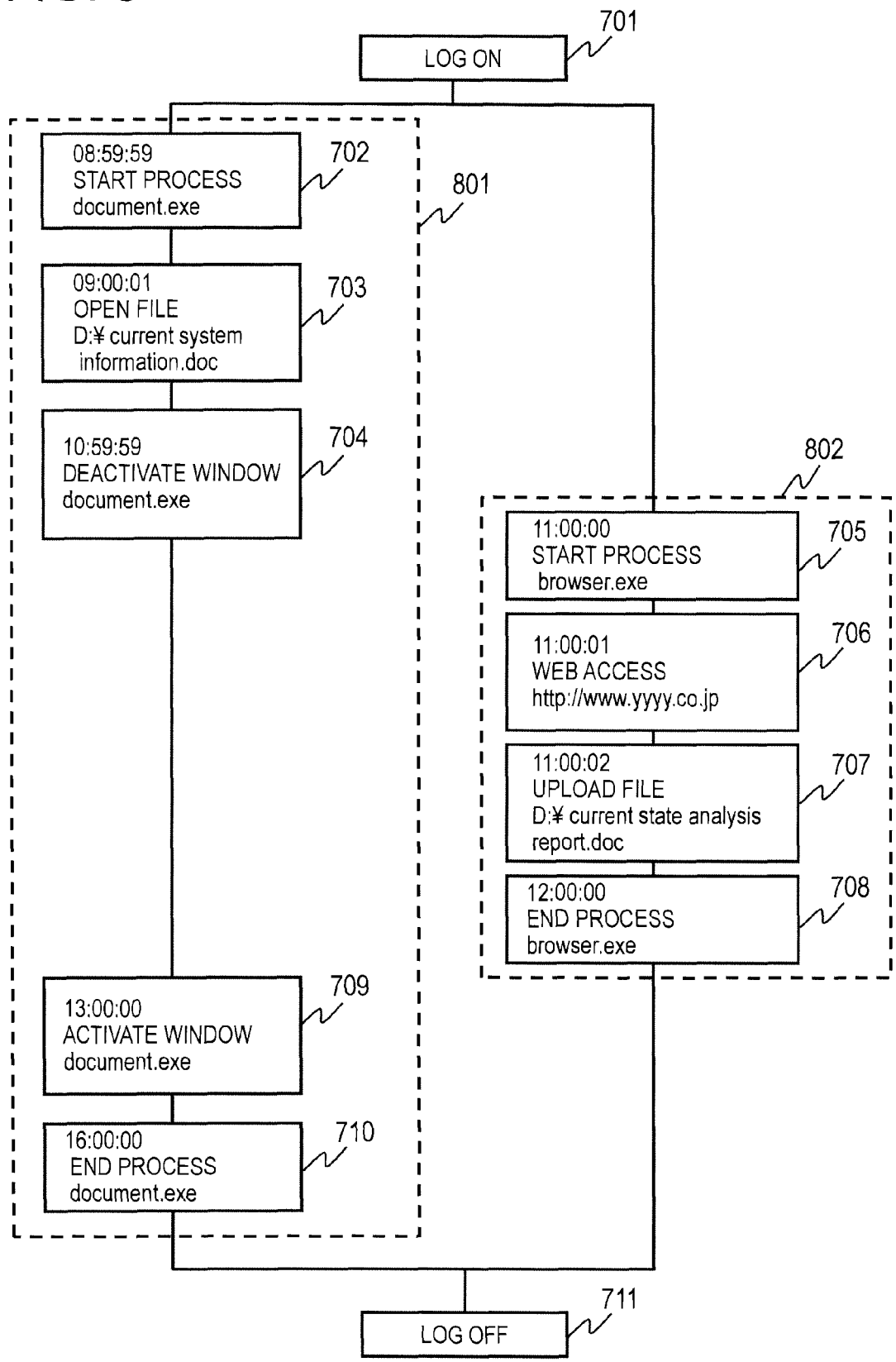
FIG. 8 shows exemplary results of grouping operation log records into a plurality of groups in Embodiment 1.

FIG. 7 shows examples of operation log records to be analyzed, operation log records 701 to 711 for the operations by a user UserA on one day. The operation log records 701 to 711 in this example are consistent with the operation log DB 212 shown in FIG. 4. FIG. 8 shows results of grouping these operation log records 701 to 711 into a plurality of groups (two operation log groups in this example) (S601).

In FIG. 8, the operation log group 801 consists of operation log records 702 to 704, 709, and 710. The other operation log group 802 consists of operation log records 705 to 708. The task analysis program 211 joins a plurality of operation log records that are presumed to be relevant to generate an operation log group. In this example, the task analysis program 211 generates an operation log group in such a manner that the operation log records presumed to have a close relationship and to be included in a series of operations are included in the same group. The generating an operation log group in this example includes the following two major steps.

The first step is to determine the group the operation log record should belong to, depending on the attribute of the operation log record. The task analysis program 211 determines the group for the operation log record with reference to the data included in the operation log record. Specifically, this step determines the group that the operation log record should belong to, based on the group identifier included in the operation log record, for example, the process ID.

In the example of FIG. 8, the operation log group 801 is a group of operation log records having the process ID 1 and the operation log group 802 is a group of operation log records having the process ID 2.

The next step is to associate a group with another that is presumed to be included in a series of operations for the same work. The task analysis program 211 determines the relationship between the two different groups based on the output information and the input information of operation log records belonging to the different groups. In this way, a series of operations in the same work (groups of operations) can be properly associated with one another by unifying a plurality of groups based on the input and output information.

Specifically, the task analysis program 211 associates a group with another if input information of an operation log record in one group is identical to output information of an operation log record in the other group. Regarding two groups including operation log records between which the output information is identical to the input information, the task analysis program 211 presumes that the two groups are included in a series of operations for the same work and places them in the unified group. In this example, the unified group is also referred to as operation log group.

In the example of FIG. 8, the output information/input information of the operation log record group 801 is not identical to the input information/output information of the operation log record group 802. Accordingly, these groups are not unified and their definitions as different operation log groups are maintained.

The task analysis program 211 determines relevancy between groups based on the input and output information and generates a unified group from a plurality of groups associated with one another. One group may be associated with more than one group; and in addition, one group may be associated with yet another group via one of the associated groups, like a chain. The unified group can include such a plurality of groups associated by the input and output information and can include more than two groups.

The operation log group generated at step S601 is a group generated at the first step that consists of a plurality of operation log records and has not been unified with any other operation log group or a group generated by unifying a plurality operation log groups. In this example, step S601 generates a plurality of operation log groups that may be clustered.

Figure 9:
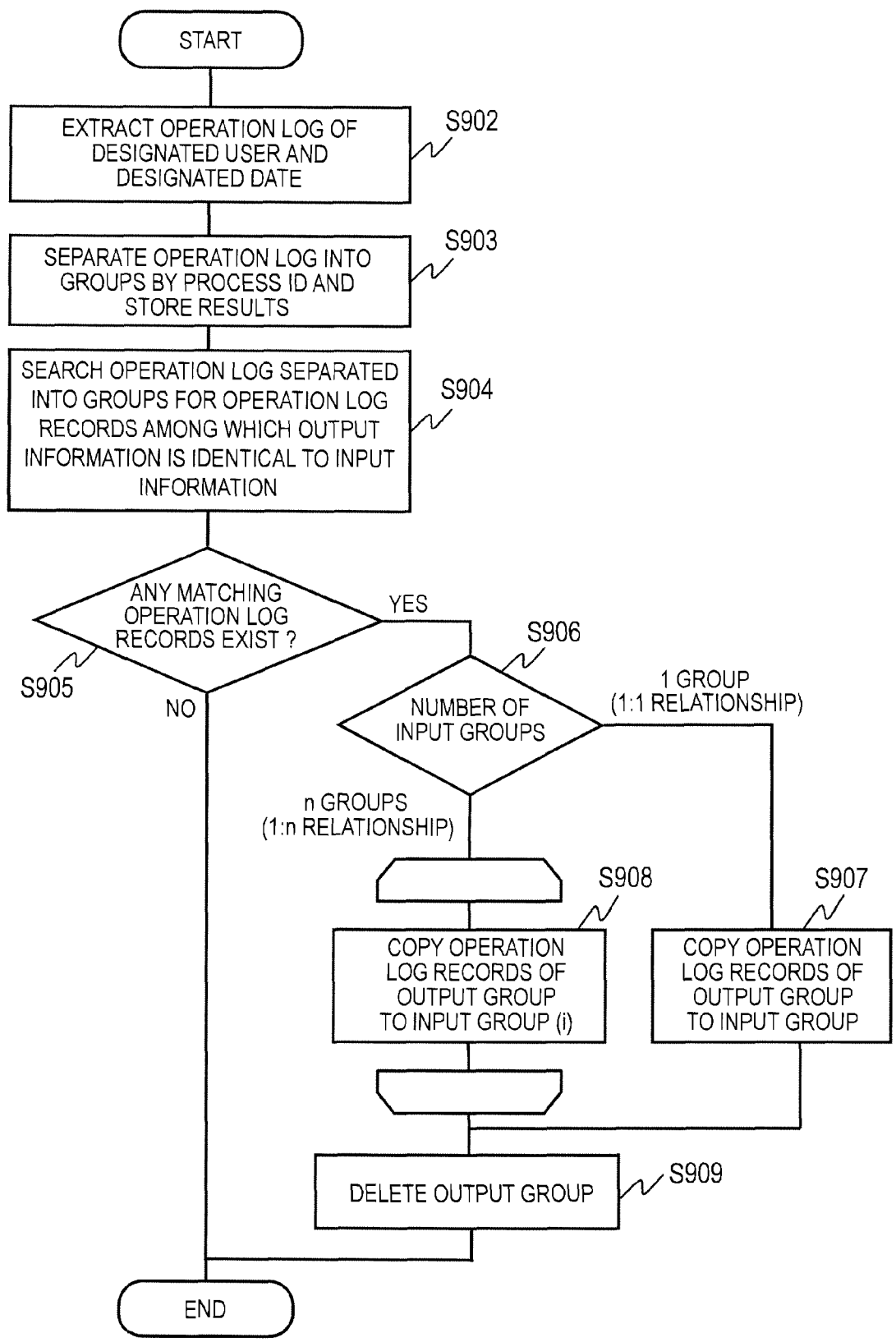
FIG. 9 is a flowchart illustrating exemplary processing by the task analysis program to generate operation log groups in Embodiment 1.

FIG. 9 is a flowchart illustrating exemplary processing by the task analysis program 211 to generate operation log groups. As described above, the task analysis program 211 generates operation log groups with reference to process IDs and input and output information. In the flowchart of FIG. 9, the task analysis program 211 first refers to the operation log DB 212 and extracts an operation log of the user and the date designated by a request for task analysis (S902). The extracted operation log is stored in the storage device 202.

Next, the task analysis program 211 separates the extracted operation log into groups by process ID and stores the separated groups in the operation log group table 215 (S903). Specifically, as described above, the task analysis program 211 refers to the process IDs of the operation log records in the extracted operation log and includes the operation log records having the same process ID in the same group.

Next, the task analysis program 211 searches the operation log records in the groups separated by process ID for operation log records among which the output information is identical to the input information (S904). The search is for determining the relationship of operation log records belonging to different groups and eliminates matches of the output information with input information in the same group. In this search, when the task analysis program 211 finds operation log records between which the output information is identical to the input information, it admits association between the groups those operation log records belong to.

In the following description, a group including an operation log record concerning output information is referred to as an output group and a group including an operation log record of which input information is identical to the output information is referred to as an input group. If the search result at step S904 indicates presence of matching operation log records (YES at S905), the task analysis program 211 moves to step S906. If no matching operation log records exist (NO at S905), the flow ends.

At step S906, the task analysis program 211 determines the number of groups including operation log records which have input information identical to the output information of one operation log record. If the determined number is one, the task analysis program 211 moves to step S907. At step S907, the task analysis program 211 copies the operation log records included in the output group to the input group.

If the determined number is n (an integer of two or more), the task analysis program 211 moves to step S908. At step S908, the task analysis program 211 copies the operation log records included in the output group into the input group i (each one of the sequentially selected plurality of input groups). The task analysis program 211 executes this step S908 for all of the groups detected at steps S905 and S906.

The task analysis program 211 does not need to perform the above-mentioned copy of operation log records as far as it can generate a unified group by associating the output group with the input groups. For example, the task analysis program 211 may store information to connect (define) the groups that constitute a unified group in the operation log group table 215. The same applies to step S907.

At step S909, the task analysis program 211 deletes the table of the output group from the operation log group table 215. The task analysis program 211 copies the operation log records of the output group to the associated input groups. The table of the output group is deleted from the operation log group table 215 at step S909.

In this example, the task analysis program 211 assigns the generated operation log group a name after unifying a plurality of log groups as necessary. The task analysis program 211 refers to the operation log group name table 214 to determine the name of the operation log group using the data of operation log records in the operation log group.

FIG. 10A exemplifies the operation log group name table 214. In the example shown in FIG. 10A, it defines, for an operation type, a verb and a data type of an object. The name of an operation log group is generated by combining the verb and the object. For example, if the name is determined by a start process operation, the name is "execute" "process name" (the process name depends on the operation).

The task analysis program 211 identifies the operation type of an operation log record selected from the operation log group, and selects the verb and the data type of the object associated with the operation type from the operation log group name table 214. The task analysis program 211 acquires data of the data type of the selected object from the operation log DB 212 or the operation log group table 215 and generates a name for the group (work) from the data of the verb and the object. FIG. 10B shows operation log group names assigned to the operation log groups 801 and 802 by the method in this example.

Figure 11:
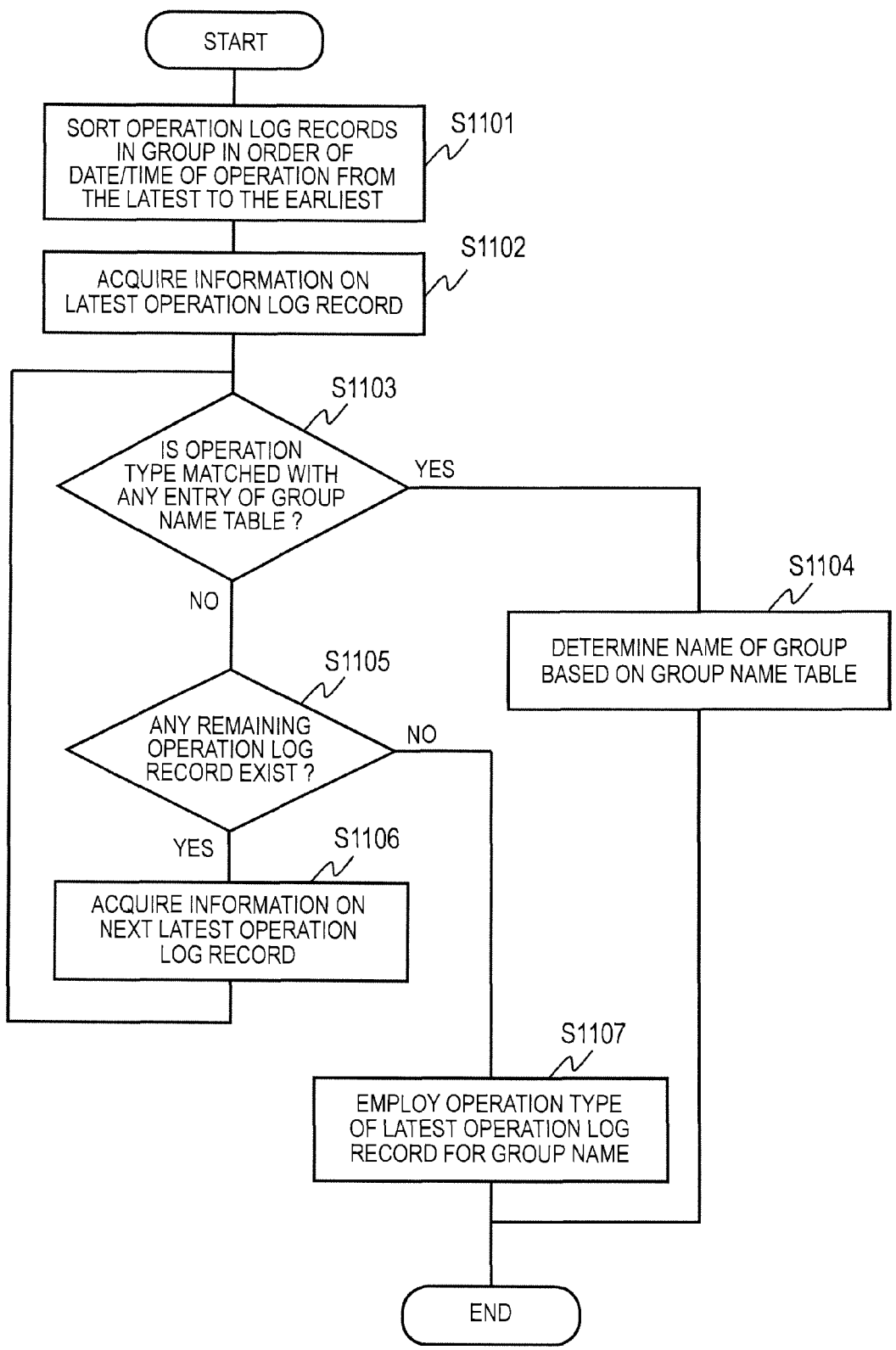
FIG. 11 is a flowchart illustrating an exemplary method of assigning a name to an operation log group in Embodiment 1.

The task analysis program 211 selects the operation log groups obtained by grouping one by one to generate a name for each operation log group. FIG. 11 is a flowchart illustrating an exemplary method of assigning a name to an operation log group. In this example, the task analysis program 211 determines the name of an operation log group (a unified group or a not-unified group) with reference to the operation log group name table 214.

The task analysis program 211 first sorts the operation log records in a selected operation log group in order of the date/time from the latest to the earliest (S1101). This step may be omitted. Next, the task analysis program 211 selects information on the latest operation log record (S1102). This is because the aim of work is more likely to be the last operation in the work or an operation close thereto.

If the operation type of the selected operation log record is matched with any entry in the operation log group name table 214 (YES at S1103), the task analysis program 211 moves to step S1104. If it is not matched with any entry (NO at S1103), the task analysis program 211 moves to step S1105.

At step S1104, the task analysis program 211 identifies the verb and the data type of the object for the operation type of the selected operation log record with reference to the operation log group name table 214, and acquires the data of the data type of the object from the operation log DB 212. The task analysis program 211 further generates a name for the work (group) from the acquired data of the verb and the object.

At step S1105, the task analysis program 211 determines whether any operation log record remains that has not been determined yet in the group. If some operation log record remains (YES at S1105), the task analysis program 211 moves to step S1106. If no operation log record remains (NO at S1105), the task analysis program 211 moves to step S1107.

At step S1106, the task analysis program 211 acquires the operation log record which is the next latest to the operation log record selected previously or the latest operation log record in the remaining operation log records. Thereafter, the task analysis program 211 returns to step S1103.

At step S1107, the task analysis program 211 generates a name for the operation log group, employing the operation type of the latest operation log record in the group because an operation (operation log record) for generating the work (group) name does not exist in the particular group of operation log.

By determining the operation log group name in accordance with the information in the operation log group, an appropriate name may be given to the work for the operation log group. Further, by preparing definition information in advance for associating an operation type with a work name and determining the work name (operation log group name) based on the operation type and the definition information selected from the operation log group, a more appropriate name may be given to the work for the group.

The task analysis program 211 may generate a name based on the operation type selected by a method different from the above-described method. For example, priorities may be given to the operation types, and the task analysis program 211 may select the operation type to be employed to determine the name in accordance with the priorities.

The task analysis program 211 does not need to use the definition information. The operation log group name table 214, which is the definition information in this example, indicates the verb and the data type of the object associated with the operation type, but a different method of determining the name may alternatively be used. For example, the task analysis program 211 may use the operation type, instead of the verb, to generate a name which does not include the part corresponding to the verb.

FIG. 12 exemplifies the operation log group table 215 for storing information on operation log groups generated by the task analysis program 211. The operation log groups are uniquely identified by the values of operation log group IDs. The operation log group IDs of the operation log groups 801 and 802 are 1 and 2, respectively. The name of the operation log group 801 is "reference current system informatin.doc" and the name of the operation log group 802 is "upload current state analysis report.doc". Neither of the operation log groups in this example is unified with another operation log group, but the operation log group table 215 can include an operation log group that has been unified with reference to the input and output information and an operation log group that has not been unified with any operation log group.

Next, the task analysis program 211 performs clustering of operation log groups stored in the operation log group table 215 (step S602 in FIG. 6). The task analysis program 211 determines whether to include two operation log groups into the same cluster based on the active periods of one operation log group in the period from the start to the end of the other operation log group.

In this example, the start time of an operation log group is the operation time of the earliest operation log record and the end time is the operation time of the latest operation log record. In another example, the start time is the time of the operation log record for the earliest start process operation in the operation log group. One operation log group can include records on a plurality of processes.

The active period is a period in which user operations in the operation log group can be effective; in this example, a period in which a window is active. When a process is started or a window for the process is selected, the window is activated (turns into an active state).

On the other hand, when a different window or the desktop is selected after a window is activated, the active window is deactivated and the state of the window turns into non-active or passive. In this example, it is presumed that a user is working using the window (process) during an active period.

Figure 13:
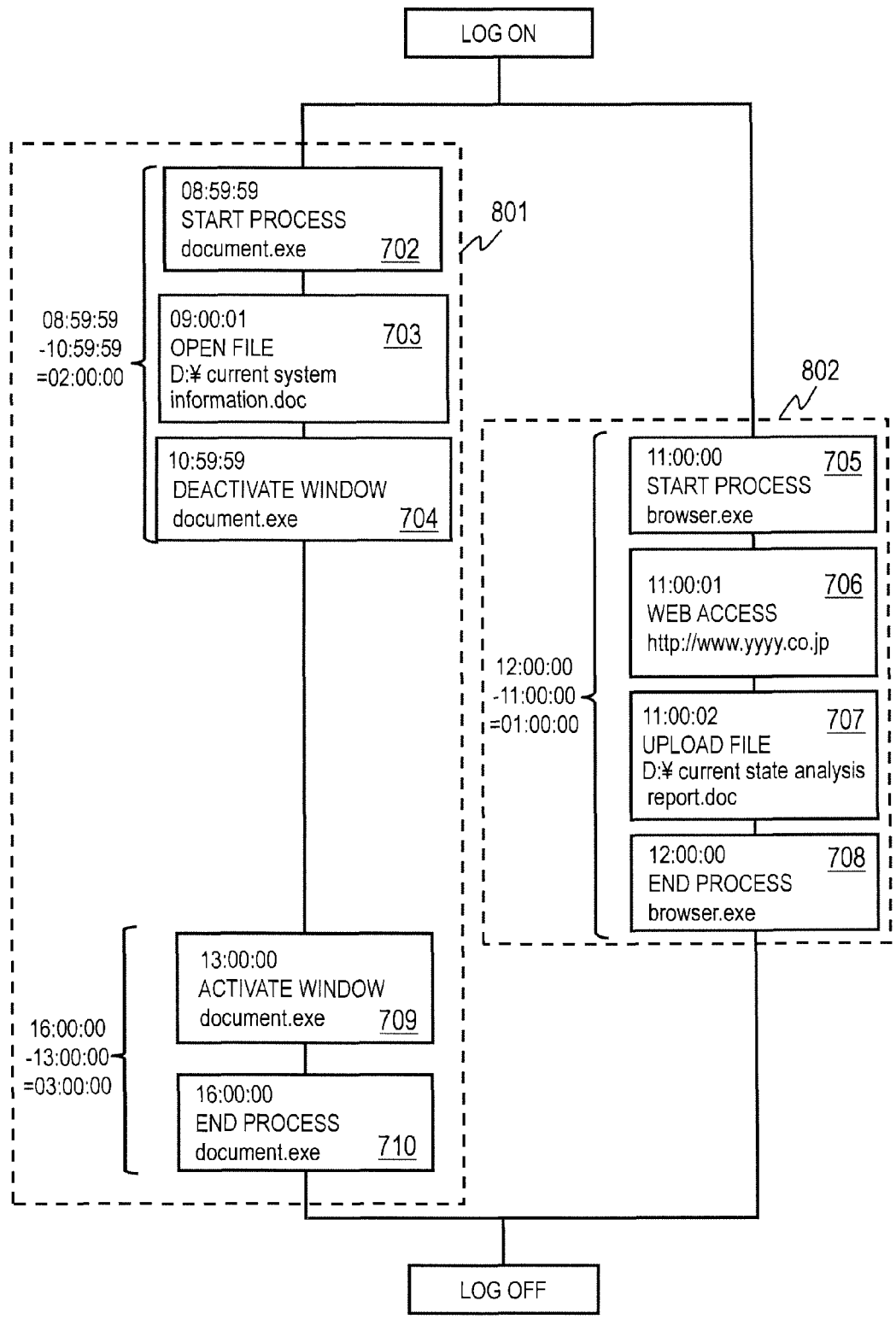
FIG. 13 illustrates active periods of the two operation log groups in the operation log group table shown in FIG. 12 in Embodiment 1.

FIG. 13 illustrates active periods of two operation log groups 801 and 802 held in the operation log group table 215 shown in FIG. 12. The operation log group 801 has two active periods: the first active period is a period from the operation log record 702 to the operation log record 704 and the second active period is a period from the operation log record 709 to the operation log record 710.

The start operation of the first active period is a start process operation (operation log record 702) and the end operation is a deactivate window operation (operation log record 704). As mentioned above, the operation log record 702 is also the start record of the operation log group 801. The start process operation activates a window. The start time of the first active period is 08:59:59 and the end time is 10:59:59. Accordingly, the length of the first active period is two hours.

The start operation of the next active period is an activate window operation (operation log record 709) and the end operation is an end process operation (operation log record 710). The operation log record 710 is the end record of the operation log group 801. The end process operation deactivates the window. The start time of this active period is 13:00:00 and the end time is 16:00:00. Accordingly, the length of this active period is three hours.

While the operation log group 801 is non-active, the other operation log group 802 is active. The operation log group 802 has one active period, which is the period from the operation log record 705 to the operation log record 708. In this example, two operation log groups are never active at the same moment.

The start operation of the active period is a start process operation (operation log record 705) and the end operation is an end process operation (operation log record 708). The operation log record 705 is also a start record of the operation log group 802 and the operation log record 708 is also an end record of the operation log group 802. The start time of this active period is 11:00:00 and the end time is 12:00:00. Accordingly, the length of this active period is one hour.

FIG. 14 exemplifies the operation log group time table 216 obtained by time calculation on the operation log groups 801 and 802 shown in FIG. 13. The operation log group time table 216 in this example has two entries: the first entry is for the operation log group 801 and the next entry is for the operation log group 802.

The columns of start times and end times respectively store the start times and the end times of operation log groups. The column of active periods stores the start times and the end times of active periods in each operation log group. The operation log group 801 has two active periods and the operation log group 802 has one. The column of total active period lengths indicates the total sum of the lengths of all active periods in each operation log group.

Figure 15:
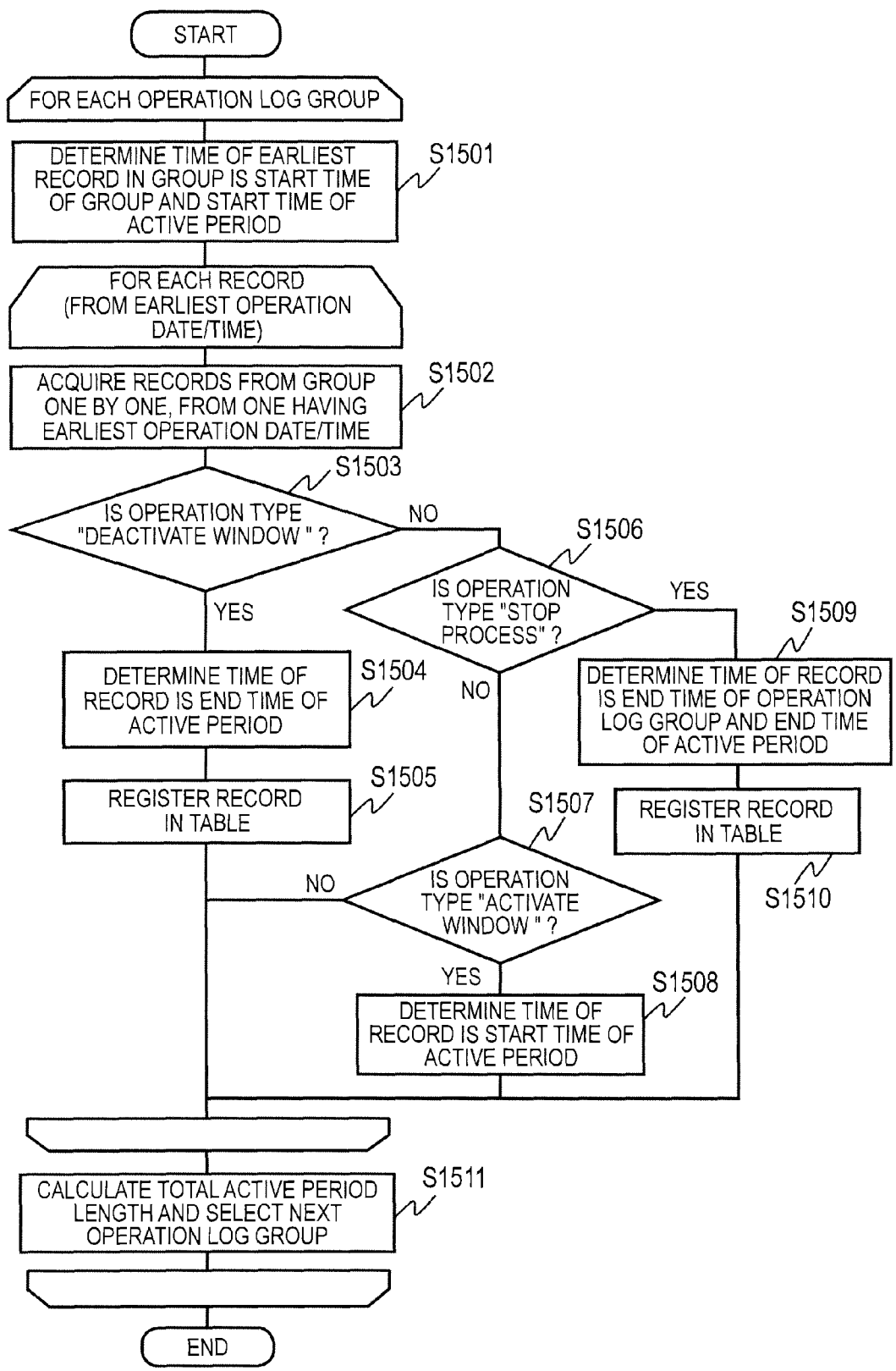
FIG. 15 is a flowchart illustrating exemplary processing to record data in the operation log group time table in Embodiment 1.

FIG. 15 is a flowchart illustrating exemplary time calculation on each operation log group, that is, exemplary processing to record data in the operation log group time table 216. The task analysis program 211 repeats steps S1501 to S1511 in sequence for each operation log group. The task analysis program 211 also repeats steps S1502 to S1510 in sequence for each operation log record in the selected operation log group.

The task analysis program 211 first refers to the operation log group table 215 and acquires information on the earliest operation log record in the selected reference operation log group. The task analysis program 211 determines that the operation time of this operation log record is the start time of this reference operation log group and further the start time of the first active period (S1501). The task analysis program 211 records this start time of the operation log group in the operation log group time table 216.

The task analysis program 211 acquires operation log records in the operation log group from the operation log group table 215 one by one, from the one having the earliest operation date/time (S1502). The task analysis program 211 determines whether the operation type of the acquired operation log record is "deactivate window" (S1503).

If the result of the determination at step S1503 is positive (YES at S1503), the task analysis program 211 determines that the operation time of the operation log record is the end time of an active period (S1504) and registers this active period in the operation log group time table 216 (S1505). Thereafter, the task analysis program 211 returns to step S1502 and executes steps S1502 to S1510 on the next operation log record.

If the result of the determination at step S1503 is negative (NO at S1503), the task analysis program 211 determines whether the operation type of the operation log record is "end process" (S1506).

If the result of the determination at step S1506 is negative, which means the operation type of the operation log record is not "end process" (NO at S1506), the task analysis program 211 determines whether the operation type of the operation log record is "activate window" (S1507). The task analysis program 211 enters this step S1507 after the previous active period is registered in the operation log group time table 216.

If the result of the determination at step S1507 is positive (YES at S1507), the task analysis program 211 determines that the operation date/time of the activate window operation is the start time of the next active period (S1508). Thereafter, the task analysis program 211 returns to step S1502 and executes steps S1502 to S1510 on the next operation log record.

On the other hand, if the result of the determination at step S1506 is positive (YES at S1506), the task analysis program 211 determines that the operation time of the operation log record is the end time of the active period (S1509). The task analysis program 211 further registers the end time of the active period in the operation log group time table 216 (S1510). The task analysis program 211 determines that the end time of the last active period is the end time of the operation log group and registers it in the operation log group time table 216.

Since all active periods in the operation log group have been registered, the task analysis program 211 sums up the lengths of all the active periods of the operation log group held in the operation log group table 215 to obtain the total active period length. The task analysis program 211 registers the obtained value of the total active period length in the operation log group time table 216 and selects the next operation log group from the operation log group table 215 (S1511). The task analysis program 211 executes steps S1501 to S1511 on the next operation log group.

Figure 16A:
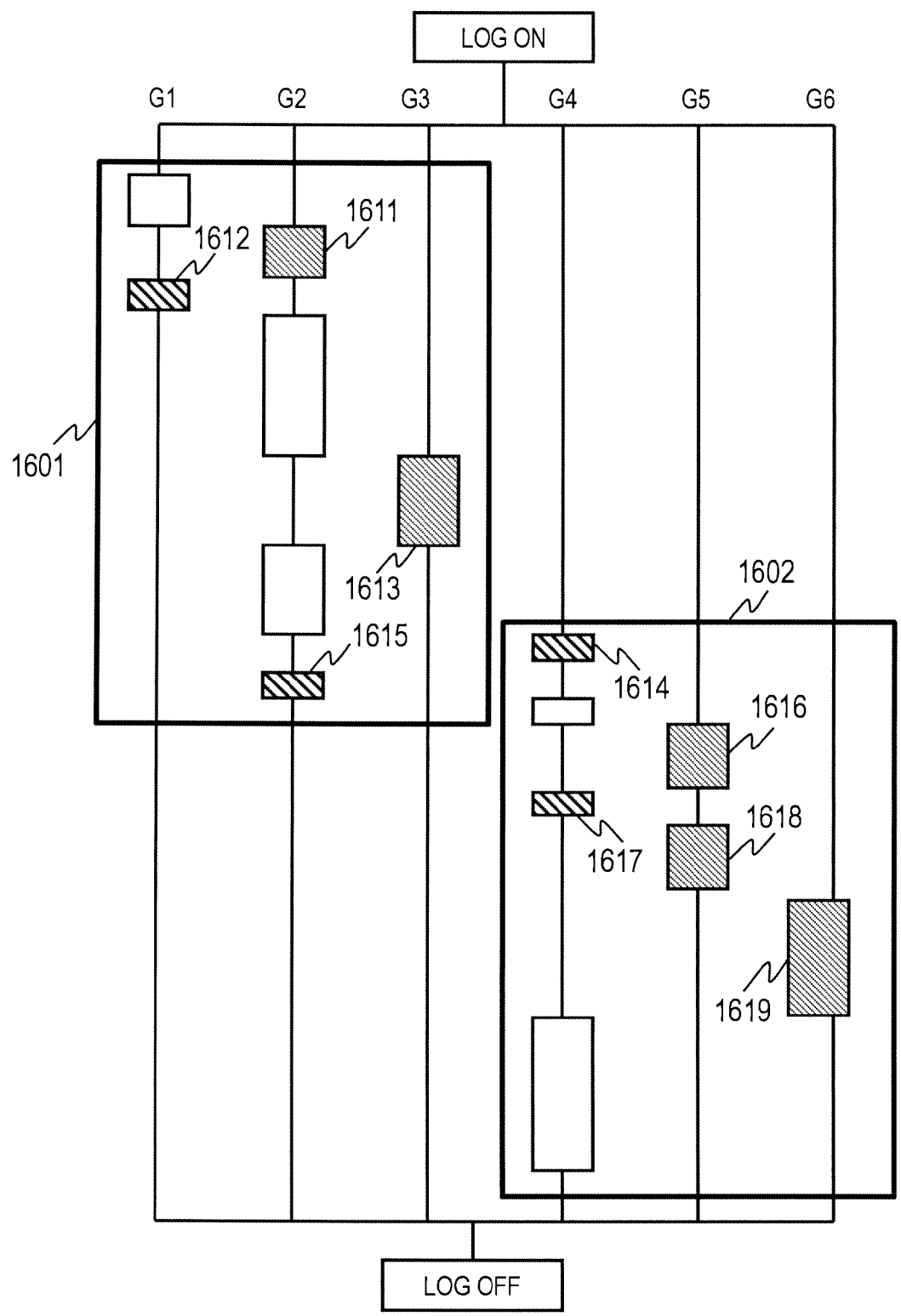
FIG. 16A illustrates an example of generating two operation log clusters from six operation log groups in Embodiment 1.

Next, clustering correlated log groups will be described. In this example, it is considered that different operation log groups included in the same cluster are different pieces of work in the same task. FIGS. 16A and 16B illustrate an example in which two operation log clusters 1601 and 1602 are generated from six operation log groups G1 to G6. FIG. 16A illustrates a sequence of the operation log groups and FIG. 16B illustrates names (work names) of the operation log groups and the configurations of the operation log clusters 1601 and 1602.

The first operation log cluster 1601 consists of operation log groups G1 to G3 and the second operation log cluster 1602 consists of operation log groups G4 to G6. In FIG. 16A, the rectangles on the operation log groups represent active periods. The names of operation log groups (pieces of work) shown in FIG. 16B are assigned in accordance with the flowchart explained with reference to FIG. 11.

The task analysis program 211 determines whether two operation log groups are included in the same cluster based on the overlap of the period from the start to the end (also referred to as start-to-end period) of one of the operation log groups (also referred to as reference operation log group) and an active period of the other operation log group (also referred to as subject operation log group).

In FIG. 16A, the start time of the earliest (the top) active period in each operation log group is the start time of the operation log group and the end time of the latest (the lowest) active period in each operation log group is the end time of the operation log group. The hatched rectangles 1611 to 1619 represent active periods that are included in the start-to-end period of a different operation log group. The rectangles 1611 to 1619 are arrayed from upper to lower in chronological order from the earliest to the latest.

In this example, the task analysis program 211 determines whether two operation log records are included in the same cluster based on the active period length of the subject operation log group included in (overlapped with) the start-to-end period of the reference operation log group. If the overlapped active period length is equal to or more than a predetermined value, the task analysis program 211 determines that the two operation log records are included in the same cluster, and if it is less than the predetermined value, the program 211 determines that the two operation log records are not included in the same cluster.

In FIG. 16A, the thin hatched rectangles represent the active periods meeting the foregoing condition on the active period length and the thick hatched rectangles represent those that do not meet the foregoing condition. Specific descriptions will follow. The active period 1612 in the operation log group G1 (subject operation log group) is in the start-to-end period of the operation log group G2 (reference operation log group) but is short; accordingly, it does not meet the foregoing condition.

In this example, it is sufficient if at least one active period in the subject operation log group is included in the period from the start time to the end time of the reference operation log group. In other words, the start time of the subject operation log group may be earlier than the start time of the reference operation log group and the end time of the subject operation log group may be later than the end time of the reference operation log group.

In the meanwhile, the active period 1611 in the operation log group G2 (subject operation log group) is in the start-to-end period of the operation log group G1 (reference operation log group) and is long; accordingly, it meets the foregoing condition. Therefore, the operation log group G2 is included in the same operation log cluster as the operation log group G1.

The active period 1613 in the operation log group G3 (subject operation log group) is in the start-to-end period of the operation log group G2 (reference operation log group) and is long; accordingly, it meets the foregoing condition. Therefore, the operation log group G3 is included in the same operation log cluster as the operation log group G2. As described above, the operation log group G2 is included in the same operation log cluster as the operation log group G1.

In this example, the operation log groups G1, G2, and G3 are included in the same cluster. In this way, if two pairs of a reference operation log group and a subject operation log group are each included in the same cluster and the two pairs include a common operation log group, this example determines that all the operation log groups in the two pairs are included in the same single cluster.

The active period 1615 in the operation log group G2 (subject operation log group) is in the start-to-end period of the operation log group G4 (reference operation log group) but is short; accordingly, it does not meet the foregoing condition. Therefore, the task analysis program 211 determines that the operation log group G2 is not included in the same operation log cluster as the operation log group G4.

The active periods 1614 and 1617 in the operation log group G4 (subject operation log group) are in the start-to-end periods of the operation log groups G2 and G5 (reference operation log groups), respectively, but are short; accordingly, they do not meet the foregoing condition. Therefore, the task analysis program 211 determines that the operation log group G4 is not included in the same operation log clusters as the operation log group either G2 or G5.

In the meanwhile, the active periods 1616 and 1618 in the operation log group G5 (subject operation log group) both are in the start-to-end period of the operation log group G4 (reference operation log group). In addition, the total length (active period length) of these active periods 1616 and 1618 meets the foregoing condition. Therefore, the task analysis program 211 determines that the operation log group G5 is included in the same operation log cluster as the operation log group G4.

Like in the example of the operation log groups G4 and G5, if the reference operation log group is interchanged with the subject operation log group, the result of the determination of clustering can be different. Like the active periods 1616 and 1618, if a plurality of active periods in the subject operation log group are included in the start-to-end period of the reference operation log group, this example makes determination of clustering based on the sum of the lengths of the plurality of active periods.

The active period 1619 in the operation log group G6 (subject operation log group) is in the start-to-end periods of the operation log group G4 (reference operation log group) and is long; accordingly, it meets the foregoing condition. Therefore, the operation log group G6 is included in the same operation log cluster as the operation log group G4.

FIG. 17 shows the results of the determination of clustering which was described with reference to FIGS. 16A and 16B. In FIG. 17, "o" denotes that the subject operation log group was determined to be included in the same cluster as the reference operation log group.

"x" denotes that the subject operation log group was determined not to be included in the same cluster as the reference operation log group because one or more active periods in the subject operation log group are included in the start-to-end period in the reference operation log group but they are short. "-" denotes that none of the active periods in the subject operation log group is included in the start-to-end period of the reference operation log group.

Figure 18:
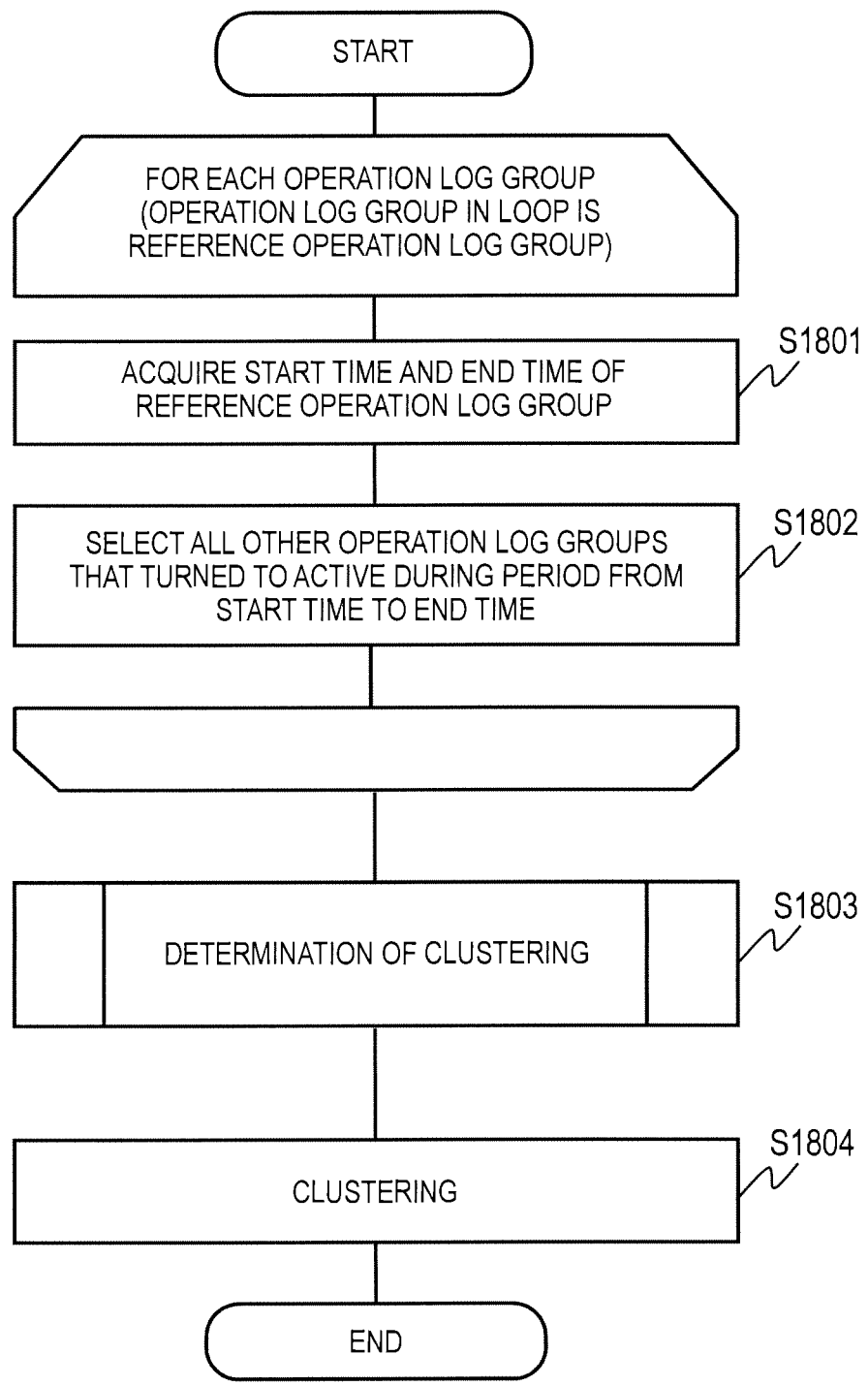
FIG. 18 is a flowchart illustrating exemplary processing to generate an operation log cluster in Embodiment 1.
Figure 19:
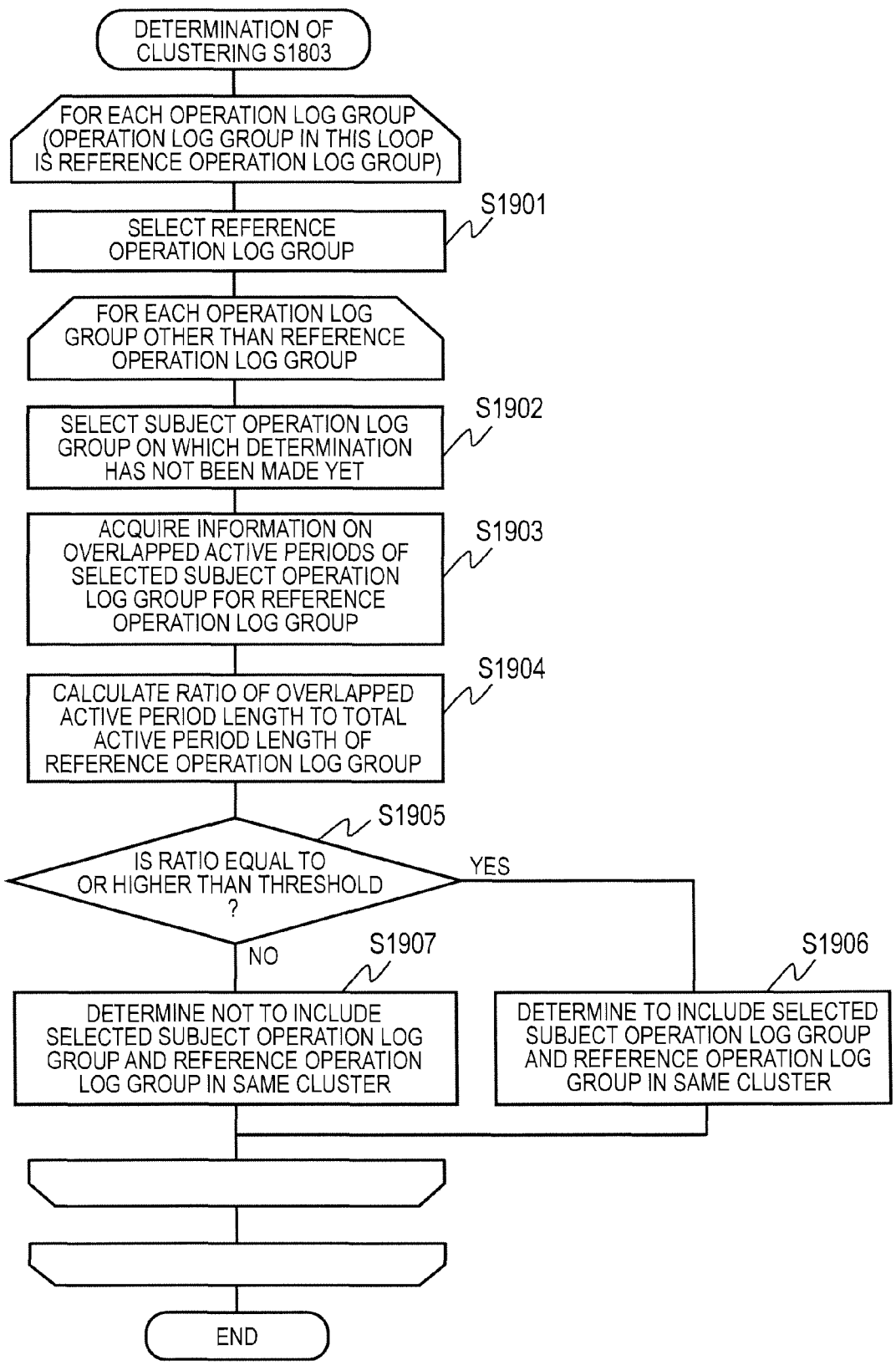
FIG. 19 is a flowchart illustrating exemplary processing to determine clustering according to FIG. 18 in Embodiment 1.

FIGS. 18 and 19 are flowcharts of exemplary processing to generate an operation log cluster. FIG. 19 illustrates exemplary determination of clustering in generation of an operation log cluster. In this example, the task analysis program 211 selects each of all the operation log groups as a reference operation log group and selects each of all the other operation log groups as a subject operation log group for the selected reference operation log group.

The task analysis program 211 sequentially selects generated operation log groups from the operation log group time table 216 and treats each of the selected operation log groups as a reference operation log group. Furthermore, the task analysis program 211 sequentially selects subject operation log groups from the operation log group time table 216 and compares the active periods of the subject operation log group with the start-to-end period of the reference operation log group to determine whether the subject operation log group is included in the same operation log cluster as the reference operation log group.

As illustrated in FIG. 18, the task analysis program 211 executes steps S1801 and S1802 for each operation log group. The operation log group in this loop is the reference operation log group. The task analysis program 211 acquires information on the start time and the end time of the reference operation log group from the operation log group time table 216 (S1801).

Next, the task analysis program 211 selects all the other operation log groups which turned to active within the period from the start time to the end time (S1802). The task analysis program 211 acquires information on active periods of the operation log groups other than the reference operation log group from the operation log group time table 216. If an active period is included in the period from the start time to the end time (start-to-end period) of the reference operation log group, the subject operation log group is determined to have turned to active within the period from the start time to the end time.

For example, assuming that the operation log group G2 is a reference operation log group in the example shown in FIG. 16A, the other operation log groups that turned to active within the start-to-end period are the operation log groups G1, G3 and G4.

Repeating steps S1801 and S1802 for all of the operation log groups selected as a reference operation log groups leads to identification of all subject operation log groups that are activated within the start-to-end period of each reference operation log group, namely, each operation log group. Thereafter, the task analysis program 211 executes determination of clustering (S1803) and further, generates operation log clusters of operation log groups that are determined to be included in the same cluster (S1804).

As described above, if the first and the second operation log groups are each clustered with a different third operation log group, the first operation log group and the second operation log group are clustered through the third operation log group. At step S1804, the task analysis program 211 identifies all operation log groups included in the same cluster. In this example, an operation log group which is not clustered with any other operation log group is treated as an operation log cluster in the subsequent processing. This flow can properly gather all operation log groups presumed to be included in the same task.

FIG. 19 is a flowchart illustrating an example of determination of clustering in FIG. 18 (S1803). The task analysis program 211 executes steps S1901 to S1907 for each operation log group. The task analysis program 211 selects an operation log group as a reference operation log group (S1901).

The task analysis program 211 repeats S1902 to S1907 for each operation log group activated within the period from the start time to the end time of the selected reference operation log group. As explained with reference to FIG. 18, the subject operation log groups that are activated within the period from the start time to the end time of each reference operation log group have already been identified.

The task analysis program 211 selects a subject operation log group on which the determination of clustering has not been made yet (S1902). The task analysis program 211 acquires information on the overlapped active period of the selected subject operation log group for the reference operation log group (S1903). Specifically, the task analysis program 211 acquires information on the start time and the end time of the reference operation log group and information on the active periods of the selected subject operation log group.

The task analysis program 211 compares the start time and the end time of each active period with the start time and the end time of the reference operation log group to determine whether the active period is in the start-to-end period of the reference operation log group. This comparison also identifies an overlapped active period, which is an active period in the start-to-end period of the reference operation log group.

Next, the task analysis program 211 calculates the ratio of the overlapped active period length to the total length of active periods of the reference operation log group (S1904). The total active period length is the total sum of the lengths of the active periods; in the example of FIG. 13, the total active period length of the operation log group 801 is (02:00:00+03:00:00)=05:00:00.

In the example of FIG. 13, the overlapped active period length of the operation log group 802 is 01:00:00. In the case where the operation log group 801 is a reference operation log group and the operation log group 802 is a subject operation log group, the ratio is 01:00:00/05:00:00=0.2. If a plurality of overlapped active periods exist, the overlapped active period length is the sum of the lengths of those periods.

Next, the task analysis program 211 determines that the calculated ratio is equal to or higher than a predetermined threshold (S1905). If the calculated ratio is equal to or higher than the threshold (YES at S1905), the task analysis program 211 determines to include the reference operation log group and the selected subject operation log group in the same cluster (S1906). If the calculated ratio is lower than the threshold (NO at S1905), the task analysis program 211 determines not to include the reference operation log group and the selected subject operation log group in the same cluster (S1907).

For example, assuming that the threshold is 0.1, the ratio in the example of FIG. 13 is 0.2 and accordingly, the operation log group 802 and the operation log group 801 are clustered. In another example, assuming that the total active period length of the reference operation log group is 09:00:00 and the overlapped active period length of the subject operation log group is 00:30:00, the ratio is approximately 0.05, which is lower than the threshold. This example does not satisfy the conditions to perform clustering and the task analysis program 211 determines that the subject operation log group is not included in the operation log cluster of the reference operation log cluster.

The foregoing example of determination of clustering based on the overlapped active period length determines whether to cluster operation log groups by the ratio of the overlapped active period length of the subject operation log group to the total active period length of the reference operation log group. This method enables proper identification of operation log groups to be included in the same operation log cluster (same task). The task analysis program 211 may perform determination of clustering by a different method.

For example, the task analysis program 211 can determine whether to cluster operation log groups based on the ratio of the overlapped active period length of the subject operation log group to the length of the start-to-end period of the reference operation log group. Alternatively, the task analysis program 211 can determine whether to cluster operation log groups based on the ratio of the overlapped active period length of the subject operation log group to the total active period length or the start-to-end period of the subject operation log group.

The task analysis program 211 can determine whether to cluster operation log groups by directly comparing the overlapped active period length with a predetermined threshold. If the overlapped active period length is the threshold or longer, the subject operation log group is determined to be included in the operation log cluster of the reference operation log group; if it is shorter than the threshold, the subject operation log group is determined not to be included in the operation log cluster of the reference operation log group.

As understood from the foregoing plurality of examples of determination of clustering based on the overlapped active period length, if the overlapped active period length is long enough to be equal to or longer than a predetermined value (which includes a value varying depending on the total active period length or the start-to-end period length of the reference operation log group), the subject operation log group is determined to be included in the operation log cluster of the reference operation log group.

Next, the task analysis program 211 assigns a name (task name) to each operation log cluster. As illustrated in the flowchart of FIG. 6, the task analysis program 211 narrows down task names to be assigned (S603), performs probability calculation to determine whether each of the narrowed-down candidate task names is appropriate for the operation log cluster (S604) to determine the task name in accordance with the results of the calculation (S605).

Figure 20:
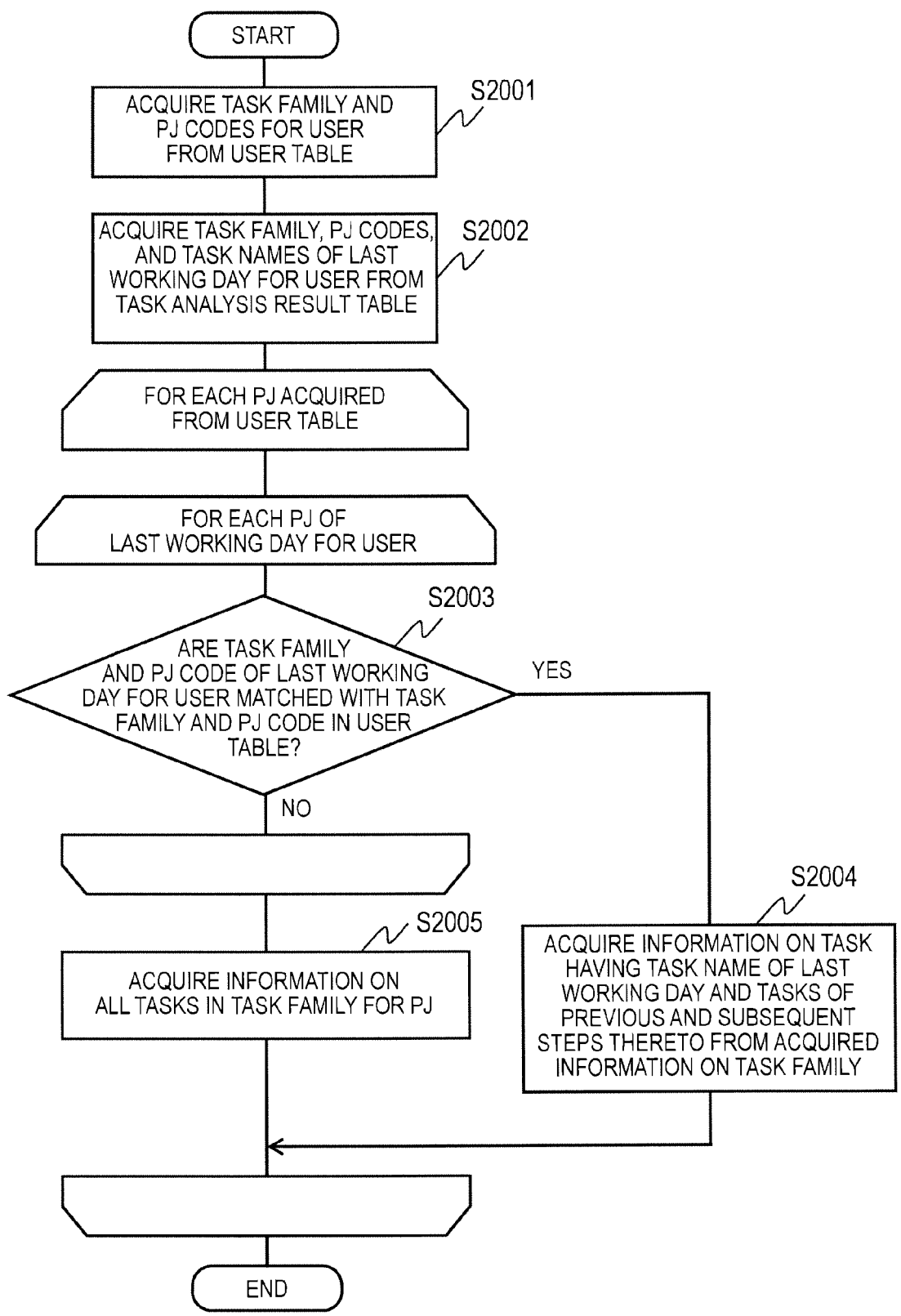
FIG. 20 is a flowchart illustrating exemplary processing to narrow down task names to be assigned in Embodiment 1.

FIG. 20 is a flowchart illustrating exemplary processing to narrow down task names to be assigned (S603). In this example, the task analysis program 211 narrows down task names based on the task family for the user and the task composition of the task family. Information on the task family for the user is included in the user table 217. The task composition of each task family is included in the task table 218.

FIG. 21 illustrates an exemplary configuration of the user table 217. In this example, the user table 217 associates a user with a project (also referred to as PJ) the user is currently engaged in and a task family for the user. For example, UserA is engaged in two projects; the codes of the projects are PJ1 and PJ2. UserA is engaged in production in a project PJ1 and also engaged in production in a project PJ2. Production is one of the task families.

FIG. 22 illustrates an exemplary configuration of the task table 218. The task table 218 has columns of task families, task names, task descriptions, and step numbers. A task family is composed of a plurality of tasks and the task name column stores task names of the tasks included in each task family. FIG. 22 shows partial data included in the task table 218, in which three task families of production, sales, and others are exemplified.

The task description column stores data indicating details of each task. The step number column indicates the sequence of tasks in each task family. In each task family, tasks are executed in the ascending order of the step number.

This example narrows down task names to be assigned based on the task which was assigned to the user at a previous time (for example, on the last working day). In an example, the task analysis program 211 selects the last task and the tasks of the previous and subsequent steps to the last task. The task names of these tasks are the narrowed-down task names. If no task exists at the previous or subsequent step to the last task, the task analysis program 211 selects only the existing task names.

The task analysis program 211 can acquire information on the last task for the user from the task analysis result table 220. FIG. 23 illustrates an exemplary configuration of the task analysis result table 220. After finishing a task analysis, the task analysis program 211 registers the result of the analysis in the task analysis result table 220.

In this example, the task analysis result table 220 has columns of working dates, users, task families, project codes, task names, and working times. The task family column stores the task families of individual tasks assigned to users. The task name column stores the task names of individual tasks in the task family. The working time column stores the total values in length of all active periods in the operation log clusters of the particular tasks. The total value is the length of time in which the user is presumed to actually carry out the task, enabling appropriate presumption of working time.

An entry of the task analysis result table 220 associates a combination of a designated user and a designated date with a result of task analysis thereof. In the case where the user is engaged in a plurality of tasks in a day, the analysis results on the tasks are stored in different entries.

For example, it is assumed that, in the task analysis result table 220, the task in the project PJ1 on the last working day for UserA is "current state analysis" in "production" and the task in the project PJ2 on the last working day is "detailed design" in "production".

The "current state analysis" in "production" is the entry 2201 in the task table 218 of FIG. 22. The "detailed design" in "production" is the entry 2202 in the task table 218.

The tasks selected for the project PJ1 as a result of the narrowing down task names are the task "current state analysis" (step number 1), which is the task assigned to UserA on the last working day, and the task "framework design" at the subsequent step number 2. The tasks selected for the project PJ2 as a result of the narrowing down the task names are the task "detailed design" (step number 4), which is the task assigned on the last working day, the task "function design" at the previous step number 3, and the task "system configuration" at the subsequent step number 5.

Now with reference to the flowchart of FIG. 20, the narrowing down task names will be described. The task analysis program 211 first acquires information on the task family and the project codes for the designated user from the user table 217 (S2001). Next, the task analysis program 211 acquires information on the task family, the project codes, and the task names of the last working day for the user from the task analysis result table 220 (S2002).

Next, the task analysis program 211 executes steps S2003 to S2005 for each of the projects acquired from the user table 217. Also, the task analysis program 211 executes the step S2003 for each of the projects of the last working day acquired from the task analysis result table 220.

At the step S2003, the task analysis program 211 determines whether any of the pairs of the task family name of a task family and the project code of a project of the last working day for the user is matched with the pair of the task family name of the task family and the project code of the project for the user, which has been acquired from the user table 217.

If none of the pairs of the last working day is matched with the pair acquired from the user table 217, in other words, if the results of the determination at step S2003 on all of the pairs of the last working day are NO, the task analysis program 211 acquires information on all tasks included in the task family of the pair acquired from the user table 217, from the task table 218 (S2005).

If a pair of the task family name of a task family and the project code of a project of the last working day for the user is matched with the pair of the task family name of the task family and the project code of the project acquired from the user table 217 (YES at S2003), the task analysis program 211 acquires information on the task having the task name of the last working day and the tasks at the previous and the subsequent steps, from the task table 218 (S2004).

As a result of this flow, candidate task names for the analyzed operation log cluster are narrowed down into the task names of the task that was assigned to the user on the last working day in the project the user currently engages in and the tasks at the previous and the subsequent steps thereto or alternatively, the task names of all the tasks in the task family for the particular project. Narrowing down task names in accordance with the task family that the user currently engages in leads to acquisition of proper candidate task names.

In addition, narrowing down task names based on the task assigned to the user on the last working day leads to acquisition of properly reduced candidate task names. In particular, selecting the task names of the task of the last working day and the tasks at the previous and the subsequent steps thereto leads to more properly reduced candidate task names. This is because a user generally engages in the same task of the last working day or the task at the previous or the subsequent step thereto. If the process will never be reversed, only the task names of the same task of the last working day and the task at the subsequent step can be selected.

In another example, the task analysis program 211 may select the latest entry for the particular project from the task analysis result table 220. The working date of the entry should be the last working day or a day prior to that date. In selecting the latest entry, some conditions may be added to the working dates of selectable entries. For example, a condition may be added that the selection can be made from the entries in a specific period from the date of the analyzed operation log.

If the task analysis program 211 cannot find an entry matched with the current project for the designated user (registered project in the user table 217), the task analysis program 211 can acquire information on all the tasks in the task family of the project from the task table 218.

Next, calculation of probabilities that the individual task names obtained by the narrowing-down step are appropriate for the operation log cluster will be described. The task analysis program 211 calculates a probability that each of the selected task names is a task name for the analyzed operation log cluster based on the history information on task names previously assigned to operation log clusters. This calculation enables the operation log cluster to be assigned an appropriate task name.

In the example explained hereafter, the task analysis program 211 identifies features of the operation log groups that constitute the operation log cluster. This example also refers to a combination of features of these operation log groups as a feature of the operation log cluster. Determining a task name based on the features of operation log groups included in an operation log cluster provides an appropriate task name for the operation log cluster that could have various configurations.

The task analysis program 211 calculates a probability that the task name will be assigned to the operation log cluster having the feature of the operation log cluster (the feature of the task) using past history records, for each of the task names obtained by the narrowing down. Determining a task name to be assigned based on the matching probability calculated from the past history records leads to assignment of a task name which is presumed to be most appropriate.

If a plurality of projects exist like in the foregoing example, probabilities of individual candidate task names in all of the projects should be calculated by operation log cluster. The probability calculation applies Bayes' theorem. The task analysis program 211 assigns the task name indicating the highest probability to the operation log cluster.

Specific explanation will be provided as follows. The task analysis program 211 uses the formula below to calculate a probability P(Task name|Feature of task) that the task name will be assigned (the task name is appropriate) under the feature (condition) of the analyzed operation log cluster. The task analysis program 211 assigns the operation log cluster the task name having the highest probability.

$$P(\text{Task name}|\text{Feature of task}) = P(\text{Feature of task}|\text{Task name}) \times P(\text{Task name})/P(\text{Feature of task})$$

As mentioned above, P(Task name|(Feature of task) is a probability that the task name for the operation log cluster having all features of operation log groups (pieces of work) that constitute the operation log cluster, namely, the task name for the operation log cluster having the feature of the task, is the particular task name. This is a posterior probability. Since this P(Feature of task) is common to all probability calculations on candidate task names, P(Task name|Feature of task) is proportional to P(Feature of task|Task name)×P(Task name) in probability calculations on candidate task names.

P(Feature of task|Task name) is a probability that the feature of the task (a combination of features of operation log groups) appears to the operation log cluster having the task name. P(Task name) is a probability that the task name will be assigned to the operation log cluster and is a probability that the task name had been assigned among all of the tasks of the past. This is a prior probability. P(Feature of task) is a probability that a task having the feature of the task will appear among all of the tasks of the past.

P(Feature of task|Task name) is also expressed by the following formula:

$$P(\text{Feature of task}|\text{Task name})=P(\text{Feature of work 1}|\text{Task name})\times \ldots P(\text{Feature of work }N|\text{Name of task})$$

Herein, the operation log cluster (task) consists of N operation log groups (N pieces of work), wherein N is an integer of two or more. In the case where a task (operation log cluster) consists of one operation log group, P(Feature of task|Task name)=P(Feature of work 1|Task name).

P(Feature of work k|Task name) is a probability that the operation log group having a feature of work k will appear in the operation log cluster having the particular task name. P(Feature of task|Task name) is a probability that the operation log cluster having the particular task name will include all of the operation log groups from the operation log group having the feature of work 1 to the operation log group having the feature of work N.

Hereinafter, a specific example of probability calculation will be described. FIGS. 24A and 24B depict exemplary configurations of two operation log clusters 1601 and 1602 generated from operation logs of a designated user and a designated date. These correspond to the example of FIG. 16B. The task analysis program 211 creates these tables and temporarily stores them in the storage device 202.

Each of the three operation log groups in the first operation log cluster 1601 is associated with an operation type, a process name, and external information. In similar, each of the three operation log groups in the second operation log cluster 1602 is associated with an operation type, a process name, and external information. The feature of an operation log group is defined by a combination of these three kinds of data.

The fields of operation type, process name, and external information in each entry contain information on an operation log record selected from the operation log group of the entry. The external information indicates the identifier of the other end of communication (transmission or reception). For example, in an operation (operation type) of "upload", "download", "FTP transmission", "FTP reception", "web access", "clipboard copy", or "clipboard paste", the external information indicates the identifier of the other end (access target) in the external in the communication made by the client computer. The types of external information are predefined in association with operation types.

A field of operation type stores the identifier of the operation type to access the target indicated by the external information. A field of process name stores the process name (the identifier of the type) of the process on which the operation indicated by the operation type field is carried out.

In an example, the task analysis program 211 selects the latest operation log record including external information in an operation log group to use the operation type, the process name, and the identifier of the access target (external information) in the operation log record as the feature of the operation log group. As previously described, the operation log records that constitute an operation log group can be acquired from the operation log group table 215.

If the operation log group does not include an operation log record including external information, the task analysis program 211 can select the operation log record that was selected to determine the name of the operation log group (work name), for example. In this case, the feature of the operation log group does not include external information.

As described above, the task analysis program 211 calculates the probability of a task name using the past history of task names assigned to operation log clusters. The past history is held in the learning table 219. FIG. 25 illustrates an exemplary configuration of the learning table 219. The learning table 219 has columns of task families, task names, operation types, process names, external information, and the number of appearances. The task analysis program 211 updates the learning table 219 with new results of analysis.

An entry associates a feature of work determined by a combination of an operation type, a process name, and external information with a task family and a task name assigned to the operation log cluster including the operation log group (work) having the feature of work and the number of appearances of the combination of the feature of work and the task name.

Each field of the column of the number of appearances indicates the number of times that the operation log group having the feature of work (the operation type, the process name, and the external information) has appeared in the operation log cluster of the task family and the task name in the entry. In other words, the number of appearances means the number of times that the task name has been assigned to the operation log cluster including the work (operation log group) having the feature of work in the past.

For example, it is assumed that an operation log cluster consists of two operation log groups X and Y, which are different in task feature, and a task family A and a task name B are assigned to the operation log cluster. The task analysis program 211 increments the number of appearances by one in the entry showing the feature of work of task family A, task name B, and operation log group X, and increments the number of appearances by one in the entry showing the feature of work of task family A, task name B, and operation log group Y.

The task analysis program 211 selects data to be used in probability calculation on the analyzed operation log cluster from the learning table 219. The task analysis program 211 selects entries of the same task names as those selected as candidate task names for the analyzed operation log cluster.

FIG. 26 shows entries selected from the learning table 219 for the probability calculation on an operation log of a designated user and a designated date, meaning the probability calculation on the first operation log cluster 1601 and the second operation log cluster 1602 in this example. The task analysis program 211 creates this table and stores it in the storage device 202.

Projects in the first and the second operation log clusters 1601 and 1602 are unknown. The candidate task names for the first operation log cluster 1601 and the second operation log cluster 1602 are the candidate task names for the two projects PJ1 and PJ2.

They are "current state analysis" in "production" and "framework design" in "production" for the project PJ1 and "detailed design", "function design", and "system configuration" in "production" for the project PJ2. The task analysis program 211 acquires all entries including these task names from the learning table 219.

The task analysis program 211 calculates a probability of each of the candidate task names "current state analysis", "framework design", "function design", "detailed design", and "system configuration" (a probability that it is an appropriate task name) for each of the first operation log cluster 1601 and the second operation log cluster 1602, using the foregoing history information selected from the learning table 219. As described previously, P(Task name|Feature of task) is proportional to P(Feature of task|Task name)×P(Task name); accordingly, the task analysis program 211 is needed to calculate P(Feature of task|Task name)×P(Task name).

Hereinafter, calculation of probability of appropriateness of the task name "current state analysis" for the first operation log cluster 1601 will be described by way of example. The features of the operation log groups in the first operation log cluster 1601 are shown in FIG. 24A. The P(Feature of task|Task name) of "current state analysis" is P((reference, document.exe, zzzz.co.jp/genjyo)|current state analysis)×P ((upload, browser.exe, zzzz.co.jp/bunseki)|current state analysis)×P((reference, browser.exe, yyyy.ne.jp/system) |current state analysis). It should be noted that URLs are partially omitted. The same applies to the following expressions in probability.

In the example of FIG. 26, it is assumed that the total sum of the number of appearances of all entries is 43 and the total sum of the number of appearances of the task name "current state analysis" is 5. In this example, P(Task name) is 5/43. Furthermore, it is assumed that the number of appearances of the entry including current state analysis, reference, document.exe, zzzz.co.jp/genjyo is 2, the number of appearances of the entry including current state analysis, upload, browser-.exe, zzzz.co.jp/bunseki is 3, and the number of appearances of the entry including current state analysis, reference, browser.exe, yyyy.ne.jp/system is unknown (the entry is unregistered).

P((reference, document.exe, zzzz.co.jp/genjyo)|current state analysis) is 2/5; and P((upload, browser.exe, zzzz.co.jp/bunseki)|current state analysis) is 3/5. In this example, if the number of appearances is unknown (unrecorded), the task analysis program 211 assumes that the number of appearances is 1 (plus smoothing). Accordingly, P((reference, browser.exe, yyyy.ne.jp/system)|current state analysis) is 1/5.

Using the foregoing values, P(Feature of task|Task name)× P(Task name) of "current state analysis" is calculated as follows:

$$\{(2/5) \times (3/5) \times (1/5)\} \times (5/43) = 6/1075$$

The obtained value 6/1075 is approximately 0.006.

The task analysis program 211 calculates individual probabilities of other candidate task names "framework design", "function design", "detailed design", and "system configuration" by the same method. Furthermore, the task analysis program 211 can calculate probabilities of candidate task names for the operation log cluster 1602, "current state analysis", "framework design", "function design", "detailed design", and "system configuration" by the same method of probability calculation on the operation log cluster 1601.

FIG. 27 shows results of the probability calculation on candidate task names for the first and the second operation log clusters 1601 and 1602. The task name having the highest probability of appropriateness for the first operation log cluster 1601 is "current state analysis" for the project PJ1. The task name having the highest probability of appropriateness for the first operation log cluster 1602 is "system configuration" for the project PJ2.

The task analysis program 211 determines to assign the task name "current state analysis" to the first operation log cluster 1601 and the task name "system configuration" to the second operation log cluster 1602. The task analysis program 211 registers the results of the analysis in the task analysis result table 220 and also updates the learning table 219 with the results of the analysis.

FIG. 28 shows an exemplary display image 2801 for the results of analysis. The task analysis program 211 can create image data from information acquired from the task analysis result table 220. The task analysis program 211 transmits the created image data to the management console 110 or the client computer 130.

The task analysis result image 2801 includes a section 2811 indicating the user and the date designated for the analysis and a section 2812 of a task list indicating the analysis result. The section 2812 displays a list of tasks performed by the user, indicating the task family, the project code, the task name, and the working time for each task. The working time is the total active period length for the corresponding operation log cluster.

FIG. 28 is merely an example of the display image 2801; the display image 2801 of analysis result can display part of the contents in this example or contents different from this example. For example, the display image 2801 may show details of tasks including the details of work (operation log groups) included in the task.

The task analysis program 211 transmits the analysis result to the management console 110 via the network I/F 206 and the network 120, using the management console communication program 210. The task analysis program 211 transmits the analysis result to the client computer 130 via the network I/F 206 and the network 120, using the client communication program 209.

The management console 110 receives the analysis result through the network I/F 117 and stores it to the storage device 112. The web browser 103 displays the received result with the display device 115. The administrator can easily ascertain the user's tasks with reference to the image 2801. This display image effectively supports the administrator to grasp and manage the activities of users.

The client computer 130 receives the analysis result through the network I/F 137 and stores it to the storage device 132. The manager communication program 138 displays the received result with the display device 135. The user can check whether the result is correct with reference to the analysis result.

If the analysis result is correct, the user sends the management server 100 a response indicating that the analysis result is correct; if it is not correct, the user sends the management server 100 correct information. The task analysis program 211 that has received the correction to the analysis result corrects the task analysis result table 220 and the learning table 219 with the received information.

Other Embodiments

Embodiment 1 separates operation log records into groups by process ID. The task analysis program 211 may use a different group identifier to generate operation log groups from operation log records.

For example, the task analysis program 211 performs grouping of operation log records by identifier for display area (such as identifier called window handle). Typically, the identifiers of display areas can be obtained from the OS. The identifiers of display areas identify windows on the screen.

For the multiple document interface (MDI), a plurality of child windows in a parent window may be assigned different identifiers. In the case where the client computer 130 employs the tabbed document interface (TDI), a window displays a plurality of documents while switching one by one by means of tabs; the individual tabs may be assigned different display area identifiers.

Alternatively, thread IDs can be used as group identifiers. In this way, operation log groups can be generated by identifiers of objects, such as processes, windows, or threads, on which operations are carries out.

The task analysis program 211 may determine the group an operation log record should belong to, based on a second group identifier other than the process ID. For example, the task analysis program 211 may separate an operation log into groups by two different kinds of group identifiers: process ID and context information. Generating operation log groups by a plurality of different identifiers leads to formation of operation log groups more consistent to the user operations.

The context information is information indicating an object to be operated. For example, the context information for the start process operation, the stop process operation, and the open file operation is information for identifying a program (file) for which a process is to be generated, for example, a file path to an access destination. The context information for the web access operation is the URL of the web access destination (web page source) or part of the URL, such as a domain.

For example, in the case where a process of a browser displays different tab pages in a window, if the access target of each tab page has a different domain, the accesses are sorted into different operation log groups. If a user uses different web applications (for example, different mailers) in the same browser process, operations on them are included in different operation log groups. The context information for the download file operation is a URL or part of the URL of the download source accessed to download a file.

Embodiment 1 unifies different operation log groups depending on input/output information to generate a new operation log group. The task analysis program 211 may omit this unification of operation log groups. Embodiment 1 assigns names (work names) to operation log groups, but may omit this step, or may determine the work names by a different method. The task analysis program 211 may generate operation log clusters from operation log records in a plurality of client computers.

The calculation of active periods in Embodiment 1 identifies periods in which a window is active to make determination of clustering in accordance with the active period. In the case where the grouping of operation log groups identifies tab pages in the TDI or child windows in the MDI with identifiers of display areas or context information, the task analysis program 211 measures the active periods of a tab page or a child window. The task analysis program 211 identifies the active periods of a specific kind of display area suitable for the grouping of operation log groups and measures them.

The task analysis program 211 can determine the task name by a method different from the one according to Embodiment 1. The task analysis program 211 may omit the narrowing-down of candidate task names. The task analysis program 211 may generate a task name from information on the operation log cluster instead of assigning a task name selected from a list of task names predetermined for an operation log cluster. The task analysis program 211 may suggest the names of one or more operation log groups included in the operation log cluster for the name of the operation log cluster (task name).

The feature of work in the probability calculation in assigning a task name may be determined by only a part of the above-mentioned three elements or elements different from those. The probability of appropriateness of a task name for the operation log cluster may be calculated by a different calculation method.

Embodiment 1 selects all operation log groups one by one as a reference operation log group to perform determination of clustering. Unlike this method, the task analysis program 211 may select only some of the operation log groups as a reference operation log group to perform the determination of clustering. For example, the task analysis program 211 may select the operation log group that starts at the earliest time to perform determination of clustering and repeat the same processing on the remaining operation log groups that are not included in the same cluster as the reference operation log group.

As set forth above, embodiments of this invention have been described; however, this invention is not limited to the foregoing embodiments. Those skilled in the art can easily modify, add, or replace each element in the foregoing embodiments within the scope of this invention.

The management system can include a plurality of management servers for collecting operation logs in a plurality of client computers, in addition to the above-described management server and the management console. For example, the central management server may collect operation logs from a plurality of other management servers and performs operation log analysis on the operation logs.

The foregoing configurations and functions, for a part or all of them, may be realized by hardware obtained by designing an integrated circuit. This invention can be also achieved by providing a system or a device with a non-transitory storage medium holding a program code of software for realizing the foregoing functions and retrieving and executing the program code held in the non-transitory storage medium by a computer (or a CPU or an MPU) of the system or the device. In this case, the program code itself retrieved from the non-transitory storage medium realizes the functions described in the foregoing embodiments; accordingly, the non-transitory storage medium holding the program code is an element of this invention.

This invention can be also achieved by that a program code of software for realizing the functions described in the foregoing embodiments is distributed via a network and stored in a storage means such as a hard disk and a memory in the system or the device or a non-transitory storage medium such as a CD and a DVD, and a computer (or a CPU or an MPU) of the system or the device retrieves and executes the program code held in the storage means or the non-transitory storage medium.

What is claimed is:

1. A log management system for analyzing and managing a log acquired in a computer, the log management system comprising:
   a processor; and
   a storage device,
   wherein the storage device stores a log of the computer;
   wherein the processor is configured to generate a plurality of log groups each formed of a plurality of log records with reference to the log stored in the storage device;
   wherein the processor is configured to identify active periods, in each of which a display area is active, in the plurality of log groups;
   wherein the processor is configured to compare a start-to-end period, which is a period from a start time to an end time of a reference log group selected from the plurality of log groups, with active periods of subject log groups other than the reference log group individually and to identify one or more subject log groups having an active period included in the start-to-end period;
   wherein the processor is configured to determine individually whether to include the identified one or more subject log groups in a same first cluster including the reference log group, based on an active period length of each of the identified one or more subject log groups within the start-to-end period;
   wherein the processor is configured to calculate individually ratios of the active period lengths of the identified one or more subject log groups within the start-to-end period to a total active period length of the reference log group;

wherein, when any of the calculated ratios is equal to or higher than a predetermined value, the processor is configured to determine to include the identified subject log group in the first cluster;

wherein the processor is configured to calculate individually total active period lengths of all the log groups included in the first cluster; and wherein the processor is configured to estimate a working time spent to a task of the first cluster from the calculated total active period lengths of all the log groups.

2. The log management system according to claim 1, wherein the processor is configured to determine individually features of the log groups included in the first cluster, using an access target indicated by an operation log record in each of the log groups and an operation type of an access to the access target;

wherein the processor is configured to refer to a past history indicating relationship between features of log groups and names assigned to clusters and to determine a name to be assigned to the first cluster based on the determined features; and wherein the processor is configured to output image data displaying the name and the working time.

3. The log management system according to claim 2, wherein the processor is configured to select candidates of the name of the first cluster from a list prepared beforehand;

wherein the storage device is configured to store information indicating features of log groups included in clusters to which the candidate names have been assigned in the past and a number of appearances of the features of the log groups in the assignment of the candidate names;

wherein the processor is configured to calculate probabilities that features of individual log groups in the first cluster will appear in individual cases where the candidate names are assigned with reference to the information;

wherein the processor is configured to calculate probabilities that features of all log groups in the first cluster will appear in individual cases where the candidate names are assigned with reference to the calculated probabilities; and wherein the processor is configured to select a name of the first cluster from the candidate names, using the calculated probabilities that the features of all log groups will appear.

4. The log management system according to claim 3, wherein the storage device stores first information indicating a current task family for a user of the computer and a task previously assigned to the user out of the task family; and wherein the processor is configured to select the candidate names including the task name of the previously assigned task and the task name of a task at a subsequent step to the previously assigned task.

5. The log management system according to claim 1, wherein the processor is configured to:
select the plurality of log groups one by one, and
for each of the selected log groups,
compare the start-to-end time of the selected log group with the active periods of the other log groups in the plurality of log groups individually and identify other log groups having an active period included in the start-to-end period of the selected log group, and
determine individually whether to include the identified other log groups in a same cluster including the selected log group, based on an active period length of each of the identified other log groups within the start-to-end period of the selected log group; and wherein, if the processor determines to include each of different log groups in the same cluster as a common log group, the processor is configured to determine to include the different log groups in a cluster.

6. A non-transitory computer readable medium storing a program for causing a management system to perform a method of analyzing and managing a log acquired in a computer, the program for execution by a processor of the management system to cause the management system to perform the steps of:

receiving the log acquired in the computer;

generating a plurality of log groups each formed of a plurality of log records with reference to the received log;

identifying active periods, in each of which a display area is active, in the plurality of log groups;

comparing a start-to-end period, which is a period from a start time to an end time of a reference log group selected from the plurality of log groups with active periods of subject log groups other than the reference log group individually, and identifying one or more subject log groups having an active period included in the start-to-end period;

determining individually whether to include the identified one or more subject log groups in a same first cluster including the reference log group, based on an active period length of each of the identified one or more subject log groups within the start-to-end period;

calculating ratios of the active period lengths of the identified one or more subject log groups within the start-to-end period to the total active period length of the reference log group individually;

when any of the calculated ratios is equal to or higher than a predetermined value, determining to include the identified subject log group in the first cluster;

calculating total active period lengths of all the log groups included in the first cluster individually; and estimating a working time spent to a task of the first cluster from the calculated total active period lengths of all the log groups.

7. The non-transitory computer readable medium according to claim 6, the program for execution by the processor of the management system to further cause the management system to perform the steps of:

determining features of the log groups included in the first cluster individually, using an access target indicated by an operation log record in each of the log groups and an operation type of an access to the access target;

referring to a past history indicating relationship between features of log groups and names assigned to clusters and determining a name to be assigned to the first cluster based on the determined features; and outputting image data displaying the name and the working time.

8. The non-transitory computer readable medium according to claim 6, the program for execution by the processor of the management system to further cause the management system to perform the steps of:

selecting candidates of the name of the first cluster from a list prepared beforehand;

calculating probabilities that features of individual log groups in the first cluster will appear in individual cases where the candidate names are assigned, with reference to information indicating features of log groups included in clusters to which the candidate names have been assigned in the past and a number of appearances of the features of the log groups in the assignment of the candidate names;

calculating probabilities that features of all log groups in the first cluster will appear in individual cases where the candidate names are assigned with reference to the calculated probabilities; and selecting a name of the first cluster from the candidate names, using the calculated probabilities that the features of all log groups will appear.

9. The non-transitory computer readable medium according to claim 8, the program for execution by the processor of the management system to further cause the management system to perform the step of:

referring to first information indicating a current task family for a user of the computer and a task previously assigned to the user out of the task family to select the candidate names including the task name of the previously assigned task and the task name of a task at a subsequent step to the previously assigned task.

10. The non-transitory computer readable medium according to claim 6, the program for execution by the processor of the management system to further cause the management system to perform the steps of:

selecting the plurality of log groups one by one, comparing, for each of the selected log groups, the start-to-end time of the selected log group with the active periods of the other log groups in the plurality of log groups individually and identifying other log groups having an active period included in the start-to-end period of the selected log group;

determining individually, for each of the selected log groups, whether to include the identified other log groups in a same cluster including the selected log group, based on an active period length of each of the identified other log groups within the start-to-end period; and determining, if it is determined to include each of different log groups in the same cluster as a common log group, to include the different log groups in the same cluster.

* * * * *